(12) United States Patent
Hwang et al.

(10) Patent No.: US 10,237,591 B2
(45) Date of Patent: Mar. 19, 2019

(54) BROADCAST SIGNAL TRANSMISSION DEVICE, BROADCAST SIGNAL RECEPTION DEVICE, BROADCAST SIGNAL TRANSMISSION METHOD, AND BROADCAST SIGNAL RECEPTION METHOD

(71) Applicant: LG ELECTRONICS INC., Seoul (KR)

(72) Inventors: Soojin Hwang, Seoul (KR); Jongyeul Suh, Seoul (KR); Sejin Oh, Seoul (KR); Hyunmook Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/754,698

(22) PCT Filed: Sep. 6, 2016

(86) PCT No.: PCT/KR2016/009965
§ 371 (c)(1),
(2) Date: Feb. 23, 2018

(87) PCT Pub. No.: WO2017/043836
PCT Pub. Date: Mar. 16, 2017

(65) Prior Publication Data
US 2018/0262785 A1     Sep. 13, 2018

Related U.S. Application Data

(60) Provisional application No. 62/216,341, filed on Sep. 9, 2015.

(51) Int. Cl.
*H04N 21/2362*     (2011.01)
*H04N 21/236*     (2011.01)
(Continued)

(52) U.S. Cl.
CPC ....... *H04N 21/2362* (2013.01); *H04N 21/236* (2013.01); *H04N 21/4343* (2013.01);
(Continued)

(58) Field of Classification Search
CPC ............. H04N 21/2362; H04N 21/236; H04N 21/4343; H04N 21/4345; H04N 21/488; H04N 21/85406; H04N 21/8543
See application file for complete search history.

(56) References Cited

U.S. PATENT DOCUMENTS

2005/0078221 A1   4/2005   Kobayashi
2006/0272000 A1*   11/2006   Kwak .................. G11B 27/10
                                                  725/137
(Continued)

FOREIGN PATENT DOCUMENTS

CN         102065235 B    6/2015
KR   10-2010-0115845 A   10/2010
(Continued)

*Primary Examiner* — Alexander Q Huerta
(74) *Attorney, Agent, or Firm* — Birch, Stewart, Kolasch & Birch, LLP

(57) ABSTRACT

The present invention presents a method for transmitting a broadcast signal. The method for transmitting a broadcast signal, according to the present invention, presents a system capable of supporting a next-generation broadcast service in an environment supporting next-generation hybrid broadcasting using a terrestrial broadcast network and an Internet network. In addition, presented is an efficient signaling method capable of covering both the terrestrial broadcast network and the Internet network in the environment supporting the next-generation hybrid broadcasting.

12 Claims, 27 Drawing Sheets

(51) Int. Cl.
*H04N 21/488* (2011.01)
*H04N 21/8543* (2011.01)
*H04N 21/434* (2011.01)
*H04N 21/854* (2011.01)

(52) U.S. Cl.
CPC ....... *H04N 21/4345* (2013.01); *H04N 21/488* (2013.01); *H04N 21/8543* (2013.01); *H04N 21/85406* (2013.01); *H04N 21/4884* (2013.01)

(56) References Cited

U.S. PATENT DOCUMENTS

| | | | | |
|---|---|---|---|---|
| 2008/0062314 | A1* | 3/2008 | Yoo | G11B 27/105 348/468 |
| 2008/0279535 | A1* | 11/2008 | Haque | H04N 5/781 386/244 |
| 2011/0242104 | A1* | 10/2011 | Zhang | H04N 13/183 345/419 |
| 2011/0268196 | A1* | 11/2011 | Suh | H04N 21/235 375/240.26 |
| 2011/0292175 | A1* | 12/2011 | Suh | H04N 21/234327 348/43 |
| 2013/0185760 | A1* | 7/2013 | Yamagishi | H04N 21/235 725/137 |
| 2017/0142499 | A1* | 5/2017 | Oh | H04N 21/235 |
| 2017/0155966 | A1* | 6/2017 | Oh | H04N 21/2362 |
| 2017/0180767 | A1* | 6/2017 | Oh | H04N 21/23614 |
| 2018/0054660 | A1* | 2/2018 | Hwang | H04N 21/234 |
| 2018/0191997 | A1* | 7/2018 | Oh | H04N 21/235 |

FOREIGN PATENT DOCUMENTS

| | | |
|---|---|---|
| KR | 10-2011-0072181 A | 6/2011 |
| KR | 10-2011-0115103 A | 10/2011 |
| WO | WO 2012/169813 A2 | 12/2012 |
| WO | WO 2015/126117 A1 | 8/2015 |

* cited by examiner

FIG. 3

| Syntax | No. of Bits | Format |
|---|---|---|
| LLS_table( ) { | | |
|   LLS_table_id | 8 | uimsbf |
|   provider_id | 8 | uimsbf |
|   LLS_table_version | 8 | uimsbf |
|   switch (LLS_table_id) { | | |
|     case 0x01: | | |
|       SLT | var | Sec. 6.3 |
|       break; | | |
|     case 0x02: | | |
|       RRT | var | See Annex F |
|       break; | | |
|     case 0x03: | | |
|       System Time | var | Sec. 6.4 |
|       break; | | |
|     case 0x04: | | |
|       CAP | var | Sec. 6.5 |
|       break; | | |
|     default: | | |
|       reserved | var | |
|   } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcCignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | Use | Data Type |
|---|---|---|
| bundleDescription | | |
|   userServiceDescription | | |
|     @globalServiceID | 1 | anyURL |
|     @serviceID | 1 | unsignedShort |
|     @serviceStatus | 0..1 | boolean |
|     @fullMPDUri | 1 | anyURL |
|     @sTSIDUri | 1 | anyURL |
|     name | 0..N | string |
|       @lang | 1 | language |
|     serviceLanguage | 0..N | language |
|     capabilityCode | 0..1 | string |
|     deliveryMethod | 1..N | |
|       broadcastAppService | 1..N | |
|         basePattern | 1..N | string |
|       unicastAppService | 0..N | |
|         basePattern | 1..N | string |

— t4010

| Element or Attribute Name | Use | Data Type |
|---|---|---|
| S-TSID | | |
|   @serviceID | 1 | unsignedShort |
|   RS | 1..N | |
|     @bsid | 0..1 | unsignedShort |
|     @sIpAddr | 0..1 | string |
|     @dIpAddr | 0..1 | string |
|     @dport | 0..1 | unsignedShort |
|     @PLPID | 0..1 | unsignedByte |
|     LS | 1..N | |
|       @tsi | 1 | unsignedInt |
|       @PLPID | 0..1 | unsignedByte |
|       @bw | 0..1 | unsignedInt |
|       @startTime | 0..1 | dateTime |
|       @endTime | 0..1 | dateTime |
|       SrcFlow | 0..1 | scrFlowType |
|       RepairFlow | 0..1 | rprFlowType | t4020

FIG. 5

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 6
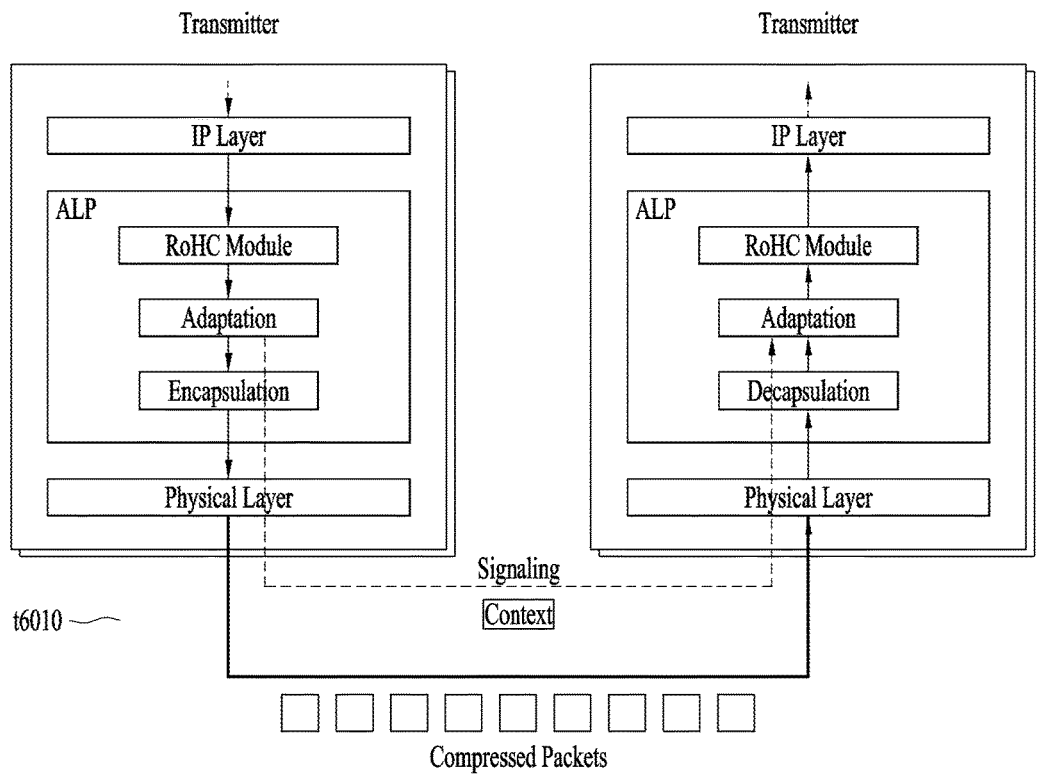
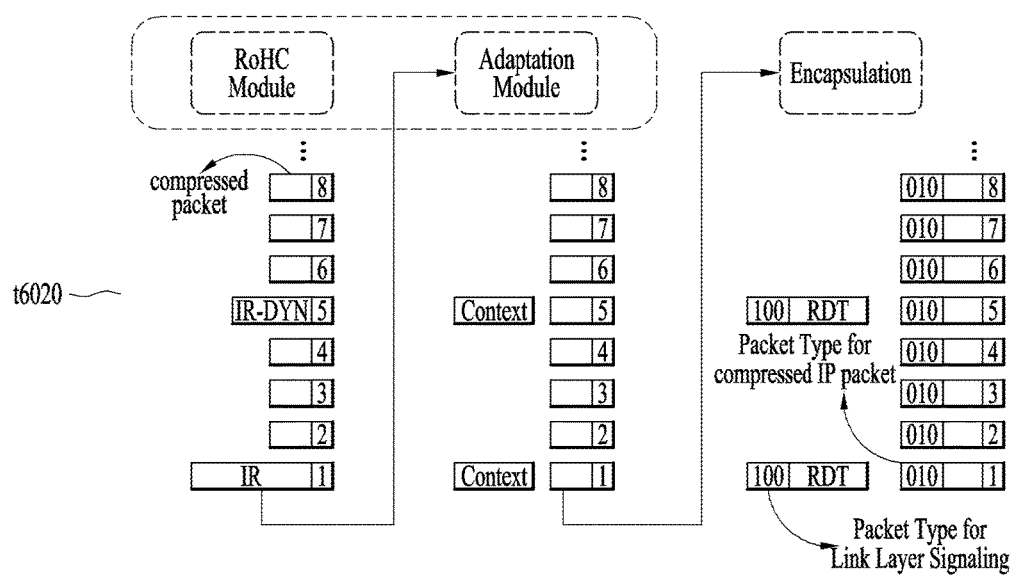

FIG. 7

| Syntax | Number of bits | Format |
|---|---|---|
| Link_Mapping_Table() { | | |
|     signaling_type | 8 | 0x01 |
|     PLP_ID | 6 | uimsbf |
|     reserved | 2 | "11" |
|     num_session | 8 | uimsbf |
|     for(i = 0 ; i < num_session ; i++) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '111111' |
|         if (SID_flag == "1") { | | |
|             SID | 8 | uimsbf |
|         } | | |
|         if (compressed_flag == '1') { | | |
|             context_id | 8 | uimsbf |
|         } | | |
|     } | | |
| } | | |

| Syntax | No. of bits | Mnemonic |
|---|---|---|
| TS_program_map_section( ) { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i=0; i<N; i++) { | | |
|         descriptor( ) | | |
|     } | | |
|     for (i=0; i<N; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0; i<N2; i++) { | | |
|             descriptor( ) | | |
|         } | | |
|     } | | |
|     CRC_32 | 32 | rpchof |
| } | | |

FIG. 16

| Syntax | Number of bits | Identifier | |
|---|---|---|---|
| subtitling_service_list_descriptor(){ | | | |
|   descriptor_tag | 8 | uimsbf | |
|   descriptor_length | 8 | uimsbf | |
|   num_of_subtitling_services | 4 | uimsbf | |
|   reserved | 4 | bslbf | |
|   for(i=0;i<num_of_subtitling_services; i++){ | | | |
|     service_id | 16 | uimsbf | |
|     num_of_components | 4 | uimsbf | ─ d16010 |
|     reserved | 4 | bslbf | |
|     for(i=0;i<num_of_components; i++){ | | | |
|       subtitling_type | 8 | bslbf | |
|       combination_of_chunk_types | 8 | bslbf | |
|       component_tag | 8 | uimsbf | |
|     } | | | |
|   } | | | |
| } | | | |

| text | position | style | font | color | ... | ... | ... |
|---|---|---|---|---|---|---|---|
| 0 | 1 | 0 | 1 | 0 | ... | ... | ... |

| Syntax | Number of bits | Identifier | |
|---|---|---|---|
| XML_subtitling_descriptor(){ | | | |
|    descriptor_tag | 8 | uimsbf | |
|    descriptor_length | 8 | uimsbf | |
|    ISO_639_language_code | 24 | bslbf | |
|    subtitling_type | 8 | bslbf | ─ d17010 |
|    subtitling_purpose | 3 | uimsbf | |
|    subtitling_read_mode | 3 | bslbf | |
|    reserved | 2 | uimsbf | |
|    subtitling_chunk_type | 8 | | |
| } | | | |

| subtitle_chunk_type | Description | |
|---|---|---|
| 0×00 | Text | |
| 0×01 | Position info | |
| 0×02 | Style info | ─ d17020 |
| 0×03 | Font info | |
| 0×04 | Color info | |
| 0×05 | Text-to-speech info (metadata) | |
| 0x06-0xFF | reserved | |

FIG. 18

| Syntax | Number of bits | Identifier |
|---|---|---|
| XML_subtitling_descriptor(){ | | |
|    descriptor_tag | 8 | uimsbf |
|    descriptor_length | 8 | uimsbf |
|    ISO_639_language_code | 24 | bslbf |
|    subtitling_type | 8 | bslbf |
|    subtitling_purpose | 3 | uimsbf |
|    subtitling_read_mode | 3 | uimsbf |
|    reserved | 6 | uimsbf |
|    num_of_chunk_types | 4 | bslbf |
|    for(i=0; i<num_of_chunk_types; i++) | | |
|      subtitling_chunk_type | 8 | uimsbf |
| } | | |

— d18010

| Syntax | Number of bits | Identifier |
|---|---|---|
| subtitling_descriptor(){ | | |
|    descriptor_tag | 8 | uimsbf |
|    descriptor_length | 8 | uimsbf |
|    for (i=0; i<N; i++){ | | |
|      ISO_639_language_code | 24 | bslbf |
|      subtitling_type | 8 | bslbf |
|      composition_page_id | 16 | bslbf |
|      ancillary_page_id | 16 | bslbf |
|    } | | |
| } | | |

— d18020

| Syntax | Number of bits | Identifier |
|---|---|---|
| subtitling_descriptor(){ | | |
|    descriptor_tag | 8 | uimsbf |
|    descriptor_length | 8 | uimsbf |
|    for (i=0; i<N; i++){ | | |
|      ISO_639_language_code | 24 | bslbf |
|      subtitling_type | 8 | bslbf |
|      subtitling_purpose | 3 | uimsbf |
|      subtitling_read_mode | 3 | uimsbf |
|      reserved | 2 | bslbf |
|      subtitling_chunk_type | 8 | uimsbf |
|    } | | |
| } | | |

| Syntax | size | type | |
|---|---|---|---|
| PES_data_field (){ | | | |
|     data_identifier | 8 | bslbf | |
|     subtitle_stream_id | 8 | bslbf | |
|     total_number_of_segments | 4 | uimsbf | |
|     reserved | 4 | bslbf | ─d19010 |
|     while nextbits() == '0000 1111'{ | | | |
|         XML_subtitling_segment () | | | |
|     } | | | |
|     end_of_PES_data_field_marker | 8 | bslbf | |
| } | | | |

| Syntax | size | type | |
|---|---|---|---|
| XML_subtitling_segment (){ | | | |
|     sync_byte | 8 | bslbf | |
|     subtitle_id | 8 | bslbf | |
|     chunk_type | 4 | uimsbf | |
|     chunk_instance_id | 4 | uimsbf | ─d19020 |
|     chunk_instance_version | 8 | bslbf | |
|     segmentation_type | 4 | uimsbf | |
|     segment_number | 4 | uimsbf | |
|     last_segment_number | 4 | uimsbf | |
|     reserved | 4 | bslbf | |
|     segment_coding_type | 8 | uimsbf | |
|     segment_length | 16 | uimsbf | |
|     segment_data_field() | | | |
| } | | | |

FIG. 20
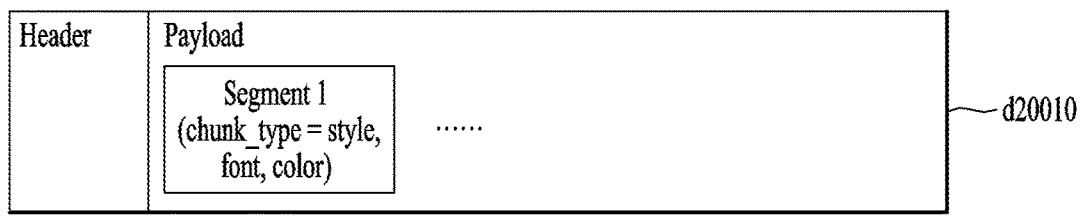
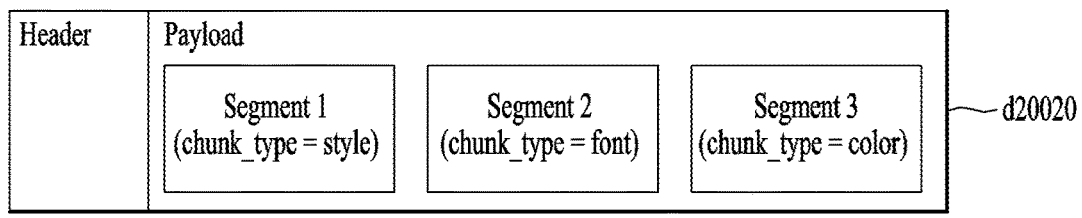
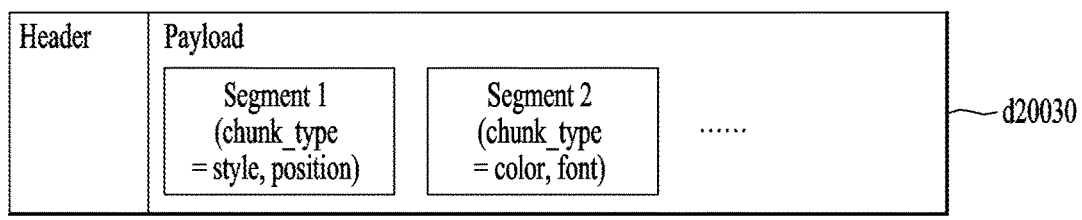

FIG. 21

| Syntax |
|---|
| Program map section ( ) {<br>　...<br><br>　PID = A<br>　　ISO_639_language_code = Korean<br>　　subtitling_purpose = normal<br>　　subtitling_read_mode = normal print<br>　　subtitle_chunk_type = style info<br>　PID = B<br>　　ISO_639_language_code = Korean<br>　　subtitling_purpose = normal<br>　　subtitling_read_mode = normal print<br>　　subtitle_chunk_type = color info<br>　PID = C<br>　　ISO_639_language_code = Korean<br>　　subtitling_purpose = normal<br>　　subtitling_read_mode = normal print<br>　　subtitle_chunk_type = font info<br>　PID = D<br>　　ISO_639_language_code = Korean<br>　　subtitling_purpose = hard of hearing<br>　　subtitling_read_mode = large print<br>　　subtitle_chunk_type = text info<br>　PID = E<br>　　ISO_639_language_code = Korean<br>　　subtitling_purpose = hard of hearing<br>　　subtitling_read_mode = large print<br>　　subtitle_chunk_type = font info<br>　...<br>} |

FIG. 22

| Syntax | Number of bits | Identifier | |
|---|---|---|---|
| event_information_section ( ){ | | | |
|   table_id | 8 | uimsbf | |
|   section_syntax_indicator | 1 | bslbf | |
|   reserved_future_use | 1 | bslbf | |
|   reserved | 2 | bslbf | |
|   section_length | 12 | uimsbf | |
|   service_id | 16 | uimsbf | |
|   reserved | 2 | bslbf | |
|   version_number | 5 | uimsbf | |
|   current_next_indicator | 1 | bslbf | |
|   section_number | 8 | uimsbf | |
|   last_section_number | 8 | uimsbf | |
|   transport_stream_id | 16 | uimsbf | |
|   original_network_id | 16 | uimsbf | — d22010 |
|   segment_last_section_number | 8 | uimsbf | |
|   last_table_id | 8 | uimsbf | |
|   for(i=0; i<N; i++){ | | | |
|     event_id | 16 | uimsbf | |
|     start_time | 40 | bslbf | |
|     duration | 24 | uimsbf | |
|     running_status | 3 | uimsbf | |
|     free_CA_mode | 1 | bslbf | |
|     descriptors_loop_length | 12 | uimsbf | |
|     for(i=0; i<N; i++){ | | | |
|       descriptor ( ) | | | |
|     } | | | |
|   } | | | |
|   CRC_32 | 32 | rpchof | |
| } | | | |

| Syntax | Number of bits | Identifier | |
|---|---|---|---|
| component_descriptor( ){ | | | |
|   descriptor_tag | 8 | uimsbf | |
|   descriptor_length | 8 | uimsbf | |
|   stream_content_ext | 4 | uimsbf | |
|   stream_content | 4 | uimsbf | |
|   component_type | 8 | uimsbf | — d22020 |
|   component_tag | 8 | uimsbf | |
|   ISO_639_language_code | 24 | bslbf | |
|   for (i=0; i<N; i++){ | | | |
|     text_char | 8 | uimsbf | |
|   } | | | |
| } | | | |

FIG. 23

| stream_content | stream_content_ext | stream_content | Description |
|---|---|---|---|
| 0×03 | n/a (see note 8) | 0×00 | reserved for future use |
| | | 0×01 | EBU Teletext subtitles |
| | | 0×02 | associated EBU Teletext |
| | | 0×03 | VBI data |
| | | 0×04 | timed text (e.g., EBU-TT-D subtitle) |

— d23010

| stream_content | stream_content_ext | stream_content | Description |
|---|---|---|---|
| 0×03 | n/a (see note 8) | 0×00 | reserved for future use |
| | | 0×01 | EBU Teletext subtitles |
| | | 0×02 | associated EBU Teletext |
| | | 0×03 | VBI data |
| | | 0×04 | TTML |
| | | 0×05 | SMPTE-TT |
| | | 0×06 | EBU-TT-D |
| | | 0×07 | EBU-TT |
| | | 0×08 | CFF-TT |
| | | 0×09 | Youview |

— d23020

| stream_content | stream_content_ext | stream_content | Description |
|---|---|---|---|
| 0×03 | n/a (see note 8) | 0×00 | reserved for future use |
| | | 0×01 | EBU Teletext subtitles |
| ...... | ...... | ...... | ...... |
| | | 0x04 to 0x0F | reserved for future use |
| 0×03 | | 0x10 | DVB subtitles (normal) with no monitor aspect ratio criticality |
| | | 0x11 | DVB subtitles (normal) for display on 4:3 aspect ratio monitor |
| | | ...... | ...... |
| 0×03 | | 0x15 | DVB subtitles (normal) with plano-stereoscopic disparity for display on a high definition monitor |
| | | 0x16 | DVB subtitles (normal) with timed text (e.g., EBU-TT-D subtitle) |
| | | 0x17 to 0x1F | reserved for future use |
| 0×03 | | 0x20 | DVB subtitles (for the hard of hearing) with no monitor aspect ratio criticality |
| | | 0x21 | DVB subtitles (for the hard of hearing) for display on 4:3 aspect ratio monitor |
| | | ...... | ...... |
| 0×03 | | 0x25 | DVB subtitles (for the hard of hearing) with plano-stereoscopic disparity for display on a high definition monitor |
| | | 0x26 | DVB subtitles (for the hard of hearing) with timed text (e.g., EBU-TT-D subtitle) |
| | | 0x27 to 0x2F | reserved for future use |
| | | | ...... |

| stream_content | stream_content_ext | stream_content | Description |
|---|---|---|---|
| 0x03 | n/a (see note 8) | 0x41 | Text |
| | | 0x42 | Position |
| | | 0x43 | Font |
| | | 0x44 | Style |
| | | 0x45 | Color |
| ...... | ...... | ...... | ...... |
| | | to 0x7F | Reserved for future use |
| ...... | ...... | ...... | ...... |

— d24010

| stream_content | stream_content_ext | stream_content | Description |
|---|---|---|---|
| 0x03 | n/a (see note 8) | 0x16 | DVB subtitles (normal) with timed text (e.g., EBU-TT-D subtitle) |
| | | 0x41 | Text |
| | | 0x43 | Font |

— d24020

BROADCAST SIGNAL TRANSMISSION DEVICE, BROADCAST SIGNAL RECEPTION DEVICE, BROADCAST SIGNAL TRANSMISSION METHOD, AND BROADCAST SIGNAL RECEPTION METHOD

CROSS REFERENCE TO RELATED APPLICATIONS

This application is the National Phase of PCT International Application No. PCT/KR2016/009965, filed on Sep. 6, 2016, which claims priority under 35 U.S.C. 119(e) to U.S. Provisional Application No. 62/216,341, filed on Sep. 9, 2015, all of which are hereby expressly incorporated by reference into the present application.

TECHNICAL FIELD

The present invention relates to a device for transmitting a broadcast signal, a device for receiving a broadcast signal and methods for transmitting and receiving a broadcast signal.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

DISCLOSURE

Technical Problem

A digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

In the case of conventional subtitle data, subtitles are provided in the form of a bitmap image and thus different types of subtitle data are provided for different aspect ratios. Alternatively, subtitle data of one standard may be provided through scaling. When this method is used in a UHD service, efficiency with respect to bandwidth decreases or sharpness and definition are deteriorated due to scaling.

Technical Solution

The present invention proposes a system capable of effectively supporting a future broadcast service in an environment supporting future hybrid broadcast using terrestrial broadcast networks and the Internet and a signaling method related thereto. As a method for solving problems that sharpness and definition of subtitle data are deteriorated, XML subtitles can be used. To this end, conventional IP broadcast subtitling service standards can be extended to be applicable to broadcast networks. That is, to transmit EBU-TT-D (European Broadcasting Union-Timed Text-D), an IMSC1 (TTML Profiles for Internet Media Subtitles and Captions 1.0) and WebVTT (Web Video Text Tracks), which are conventional XML-based subtitles transmitted through a broadcast network, a broadcast system can multiplex XML-based subtitles into MPEG-2 TSs and transmit the MPEG-2 TSs. The present invention proposes signaling and transmission/reception system operations when XML based subtitles are transmitted through MPEG-2 TS.

Advantageous Effects

The present invention can effectively support future broadcast services in an environment supporting future hybrid broadcasting using terrestrial broadcast networks and the Internet.

The present invention can support a method of providing detailed signaling with respect to service components included in a broadcast service.

The present invention can support a method of efficiently providing various types of information such as 3D content, closed captioning WCG and HDR in a method of delivering a broadcast service.

The present invention can apply an XML subtitle service and related signaling to broadcast and streaming services.

DESCRIPTION OF DRAWINGS

The accompanying drawings, which are included to provide a further understanding of the invention, illustrate embodiments of the invention and together with the description serve to explain the principle of the invention. In the drawings:

FIG. 3 is a diagram showing a low level signaling (LLS) table and a service list table (SLT) according to one embodiment of the present invention;

FIG. 4 is a diagram showing a USBD and an S-TSID delivered through ROUTE according to one embodiment of the present invention;

FIG. 5 is a diagram showing a USBD delivered through MMT according to one embodiment of the present invention;

FIG. 6 is a diagram showing link layer operation according to one embodiment of the present invention;

FIG. 7 is a diagram showing a link mapping table (LMT) according to one embodiment of the present invention;

FIG. 9 is a diagram showing a write operation of a time interleaver according to an embodiment of the present invention;

FIG. 15 is a diagram showing a configuration of a PMT (Program Map Table);

FIG. 16 shows a list descriptor for a subtitling service according to an embodiment of the present invention;

FIG. 17 shows an XML subtitling descriptor according to an embodiment of the present invention;

FIG. 18 shows an XML subtitle descriptor according to another embodiment of the present invention;

FIG. 19 is a diagram showing a PES_data_field including XML_subtitling_segment according to an embodiment of the present invention;

FIG. 20 shows a method of dividing a subtitle packet into segments according to an embodiment of the present invention;

FIG. 21 shows a method of transmitting subtitles using multiple PIDs according to an embodiment of the present invention;

FIG. 22 shows a method of providing signaling with respect to an XML subtitle service according to an embodiment of the present invention;

FIG. 23 is a diagram showing a component descriptor according to an embodiment of the present invention;

FIG. 24 is a diagram showing a component descriptor according to another embodiment of the present invention;

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc. The present invention proposes a physical profile (or system) optimized to minimize receiver complexity while accomplishing performance required for a specific purpose.

Figure 1:
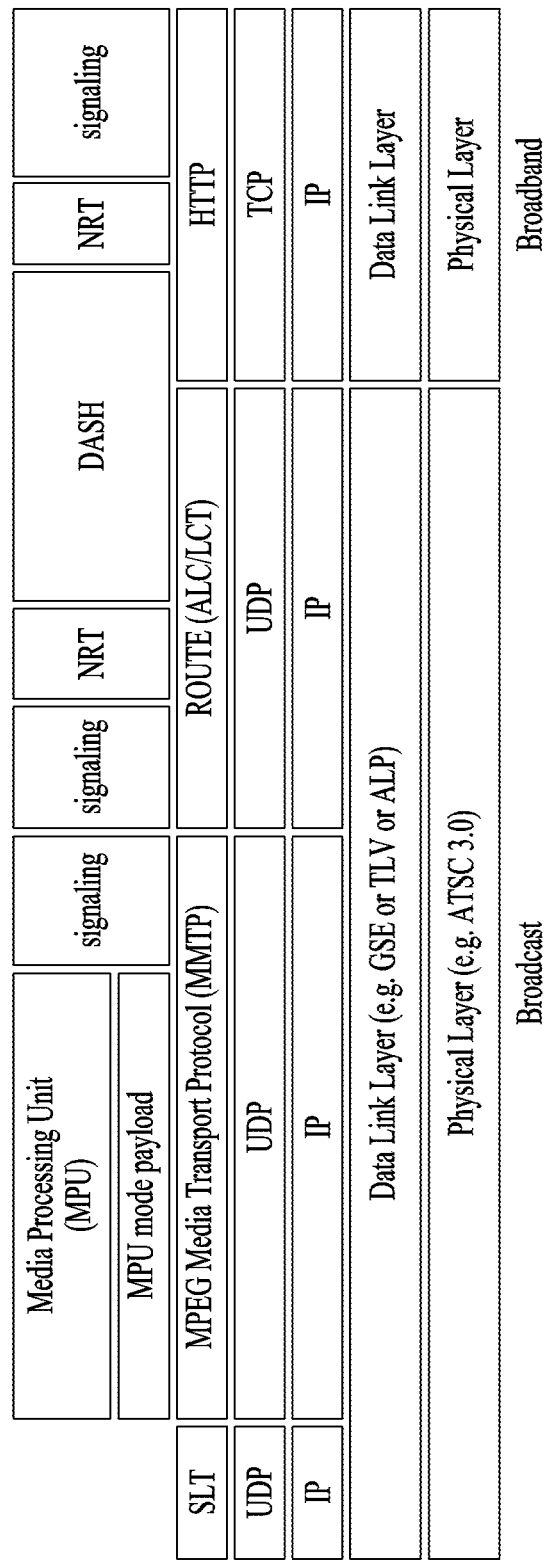
FIG. 1 is a diagram showing a protocol stack according to an embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
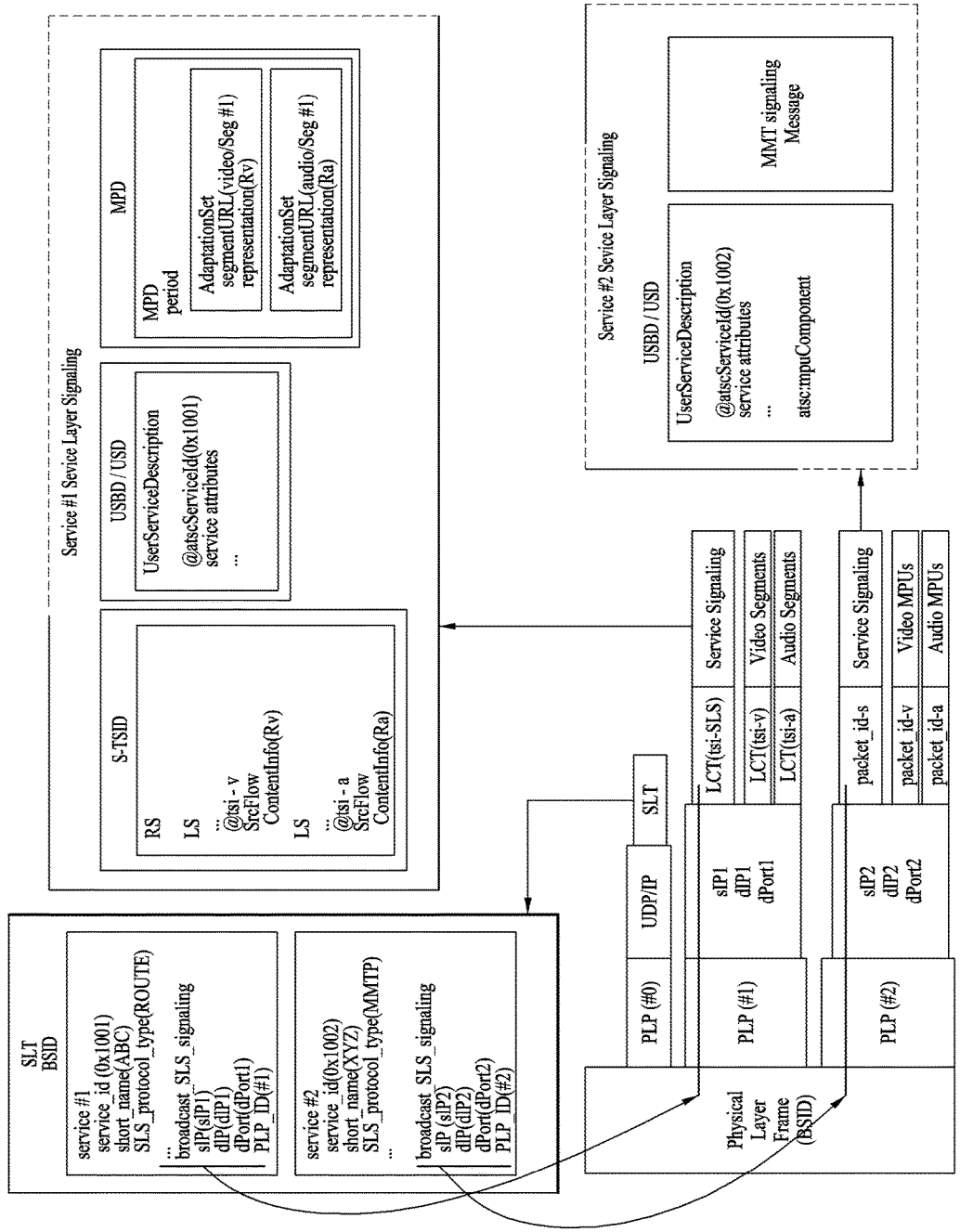
FIG. 2 is a diagram showing a service discovery procedure according to one embodiment of the present invention.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMP-DUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may include a header compressor/decompressor and/or an adaptation module. The IP header compressor (RoHC compressor) may reduce the size of each IP packet based on a RoHC method. Then, adaptation module may extract context information and generate signaling information from each packet stream. A receiver may parse signaling information related to a corresponding packet stream and attach the context information to the packet stream. The RoHC decompressor may recover a packet header to reconfigure an original IP packet. Hereinafter, IP header compression may refer to only IP header compressor via header compressor and may be a concept that combines IP header compression and the adaptation procedure by the adaptation module. This may be the same as in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may construct link layer signaling using context information and/or configuration parameters. The adaptation function may periodically transmit link layer signaling through each physical frame using a previous configuration parameter and/or context information.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT may be transmitted whenever context information is changed. In some embodiments, the RDT may be transmitted in every physical frame. To transmit the RDT in every physical frame, a previous RDT may be re-used.

The receiver may select a first PLP and first acquire signaling information of the SLT, the RDT, etc., prior to acquisition of a packet stream. Upon acquiring the signaling information, the receiver may combine the information to acquire mapping of service—IP information—context information—PLP. That is, the receiver may recognize IP streams through which a service is transmitted, IP streams transmitted through a PLP, and so on and acquire corresponding context information of the PLPs. The receiver may select a PLP for delivery of a specific packet stream and decode the PLP. The adaptation module may parse the context information and combine the context information with the compressed packets. Thereby, the packet stream may be recovered and transmitted to the RoHC de compressor. Then, decompression may be started. In this case, the receiver may detect an IR packet and start decompression from a first received IR packet according to an adaptation mode (mode 1), may detect an IR-DYN packet and start decompression from a first received IR-DYN packet (mode 2), or may start decompression from any general compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may be referred to as multicast. Information on IP streams or transport sessions transmitted through one PLP may be acquired through the LMT. In contrast, information on through which PLP a specific transport session is delivered may be acquired.

The LMT may be transmitted through any PLP identified to deliver the LLS. Here, the PLP for delivering the LLS may be identified by an LLS flag of L1 detail signaling information of a physical layer. The LLS flag may be a flag field indicating whether the LLS is transmitted through a corresponding PLP with respect to each PLP. Here, the L1 detail signaling information may be correspond to PLS2 data which will be described later.

That is, the LMT may also be transmitted through the same PLP along with the LLS. Each LMT may describe mapping between PLPs and IP address/port as described above. As described above, the LLS may include an SLT and, in this regard, the IP address/ports described by the LMT may be any IP address/ports related to any service, described by the SLT transmitted through the PLP such as a corresponding LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, as described above, the LMT may describe PLPs of all IP addresses/ports related to all service described by the SLT transmitted therewith using a PLP loop.

The signaling_type field may indicate the type of signaling information delivered by the table. The value of signaling_type field for the LMT may be set to 0x01. The signaling_type field may signaling_type field may be omitted. The PLP_ID field may identify a target PLP to be described. When the PLP loop is used, each PLP_ID field may identify each target PLP. Fields from the PLP_ID field may be included in the PLP loop. Here, the below-described PLP_ID field may be an identifier of one PLP of the PLP loop and the following fields may be fields corresponding to the corresponding PLP.

The num_session field may indicate the number of higher layer sessions delivered through the PLP identified by the PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field, and/or a context_id field.

The src_IP_add field, the dst_IP_add field, the src_UDP_port field, and the dst_UDP_port field may indicate the source IP address, the destination IP address, the source UDP port and the destination UDP port of the transport session among the higher layer sessions delivered through the PLP identified by the PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. When header compression is applied (compressed_flag=1), the RDT may be present and the PLP ID field of the RDT may have the same value as the corresponding PLP_ID field related to the present compressed_flag field.

The SID field may indicate a sub stream ID (SID) of link layer packets for delivering a corresponding transfer session. The link layer packets may include the SID having the same value as the present SID field in the optional header. Thereby, the receiver may filter link layer packets using information of the LMT and SID information of a link layer packet header without parsing of all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
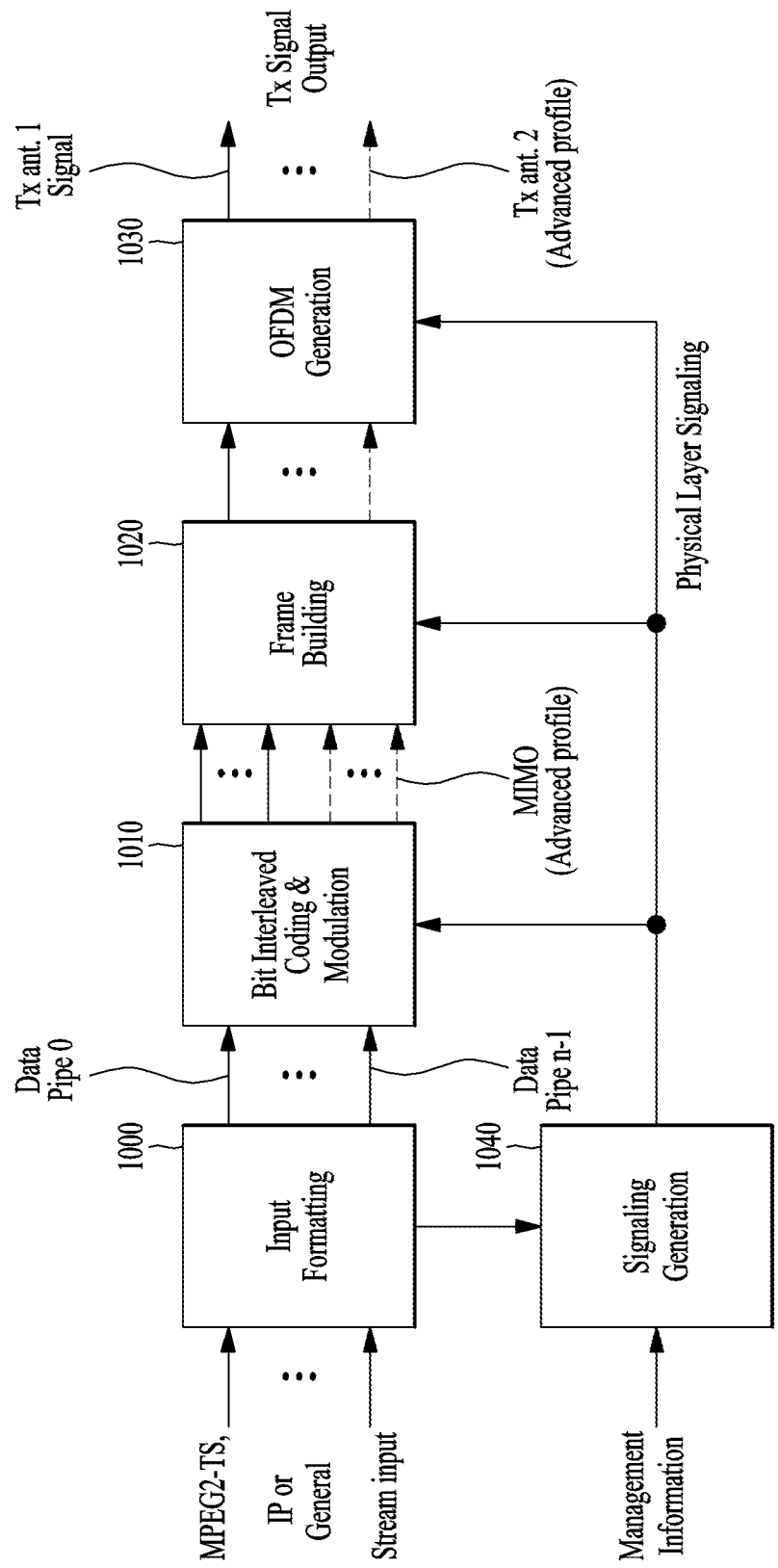
FIG. 8 is a diagram showing a structure of a broadcast signal transmission device of a next-generation broadcast service according to an embodiment of the present invention.

FIG. 8 is a diagram showing a structure of a broadcast signal transmission device of a next-generation broadcast service according to an embodiment of the present invention.

The broadcast signal transmission device of the next-generation broadcast service according to an embodiment of the present invention may include an input format block 1000, a bit interleaved coding & modulation (BICM) block 1010, a frame building block 1020, an orthogonal frequency division multiplexing (OFDM) generation block 1030, and a signaling generation block 1040. An operation of each block of the broadcast signal transmission device will be described.

According to an embodiment of the present invention, input data may use IP stream/packet and MPEG2-TS as main input format and other stream types may be handled as a general stream.

The input format block 1000 may demultiplex each input stream using one or more data pipes to which independent coding and modulation are applied. The data pipe may be a basic unit for robustness control and may affect quality of service (QoS). One or more services or service components may affect one data pipe. The data pipe may be a logical channel in a physical layer for delivering service data or metadata for delivering one or more services or service components.

Since QoS is dependent upon the characteristics of a service provided by the broadcast signal transmission device of the next-generation broadcast service according to an embodiment of the present invention, data corresponding to each service needs to be processed via different methods.

The BICM block 1010 may include a processing block applied to a profile (or system) to which MIMO is not applied and/or a processing block of a profile (or system) to which MIMO is applied and may include a plurality of processing blocks for processing each data pipe.

The processing block of the BICM block to which MIMO is not applied may include a data FEC encoder, a bit interleaver, a constellation mapper, a signal space diversity (SSD) encoding block, and a time interleaver. The processing block of the BICM block to which MIMO is applied is different from the processing block of the BICM to which MIMO is not applied in that a cell word demultiplexer and an MIMO encoding block are further included.

The data FEC encoder may perform FEC encoding on an input BBF to generate a FECBLOCK procedure using external coding (BCH) and internal coding (LDPC). The external coding (BCH) may be a selective coding method. The bit interleaver may interleave output of the data FEC encoder to achieve optimized performance using a combination of the LDPC code and a modulation method. The constellation mapper may modulate cell word from a bit interleaver or a cell word demultiplexer using QPSK, QAM-16, irregular QAM (NUQ-64, NUQ-256, NUQ-1024), or irregular constellation (NUC-16, NUC-64, NUC-256, NUC-1024) and provide a power-normalized constellation point. NUQ has an arbitrary type but QAM-16 and NUQ have a square shape. All of the NUQ and the NUC may be particularly defined with respect to each code rate and signaled by parameter DP_MOD of PLS2 data. The time interleaver may be operated at a data pipe level. A parameter of the time interleaving may be differently set with respect to each data pipe.

The time interleaver according to the present invention may be positioned between the BICM chain and the frame builder. In this case, the time interleaver according to the present invention may selectively use a convolution interleaver (CI) and a block interleaver (BI) according to a physical layer pipe (PLP) mode or may use all. The PLP according to an embodiment of the present invention may be a physical path used using the same concept as the aforementioned DP and its term may be changed according to designer intention. The PLP mode according to an embodiment of the present invention may include a single PLP mode or a multiple PLP mode according to the number of PLPs processed by the broadcast signal transmitter or the broadcast signal transmission device. Time interleaving using different time interleaving methods according to a PLP mode may be referred to as hybrid time interleaving.

A hybrid time interleaver may include a block interleaver (BI) and a convolution interleaver (CI). In the case of PLP_NUM=1, the BI may not be applied (BI off) and only the CI may be applied. In the case of PLP_NUM>1, both the BI and the CI may be applied (BI on). The structure and operation of the CI applied in the case of PLP_NUM>1 may be different from those of the CI applied in the case of PLP_NUM=1. The hybrid time interleaver may perform an operation corresponding to a reverse operation of the aforementioned hybrid time interleaver.

The cell word demultiplexer may be used to divide a single cell word stream into a dual cell word stream for MIMO processing. The MIMO encoding block may process output of the cell word demultiplexer using a MIMO encoding method. The MIMO encoding method according to the present invention may be defined as full-rate spatial multiplexing (FR-SM) for providing increase in capacity via relatively low increase in complexity at a receiver side. MIMO processing may be applied at a data pipe level. When a pair of constellation mapper outputs, NUQ $e_{1,i}$ and $e_{2,i}$ is input to a MIMO encoder, a pair of MIMO encoder outputs, g1,i and g2,i may be transmitted by the same carrier k and OFDM symbol 1 of each transmission antenna.

The frame building block 1020 may map a data cell of an input data pipe in one frame to an OFDM symbol and perform frequency interleaving for frequency domain diversity.

According to an embodiment of the present invention, a frame may be divided into a preamble, one or more frame signaling symbols (FSS), and a normal data symbol. The preamble may be a special symbol for providing a combination of basic transmission parameters for effective transmission and reception of a signal. The preamble may signal a basic transmission parameter and a transmission type of a frame. In particular, the preamble may indicate whether an emergency alert service (EAS) is currently provided in a current frame. The objective of the FSS may be to transmit PLS data. For rapid synchronization and channel estimation and rapid decoding of PLS data, the FSS may have a pipe pattern with higher density than a normal data symbol.

The frame building block may include a delay compensation block for adjusting timing between a data pipe and corresponding PLS data to ensure co-time between a data pipe and corresponding PLS data at a transmitting side, a cell mapper for mapping a PLS, a data pipe, an auxiliary stream, a dummy stream, and so on to an active carrier of an OFDM symbol in a frame, and a frequency interleaver.

The frequency interleaver may randomly interleave a data cell received from the cell mapper to provide frequency diversity. The frequency interleaver may operate with respect to data corresponding to an OFDM symbol pair including two sequential OFDM symbols or data corresponding to one OFDM symbol using different interleaving seed orders in order to acquire maximum interleaving gain in a single frame.

The OFDM generation block 1030 may modulate an OFDM carrier by the cell generated by the frame building block, insert a pilot, and generate a time domain signal for transmission. The corresponding block may sequentially insert guard intervals and may apply PAPR reduction processing to generate a last RF signal.

The signaling generation block 1040 may generate physical layer signaling information used in an operation of each functional block. The signaling information according to an embodiment of the present invention may include PLS data. The PLS may provide an element for connecting a receiver to a physical layer data pipe. The PLS data may include PLS1 data and PLS2 data.

The PLS1 data may be a first combination of PLS data transmitted to FSS in a frame with fixed size, coding, and modulation for transmitting basic information on a system as well as a parameter required to data PLS2 data. The PLS1 data may provide a basic transmission parameter including a parameter required to receive and decode PLS2 data. The PLS2 data may be a second combination of PLP data transmitted to FSS for transmitting more detailed PLS data of a data pipe and a system. PLS2 signaling may further include two types of parameters of PLS2 static data (PLS2-STAT data) and PLS2 dynamic data (PLS2-DYN data). The PLS2 static data may be PLS2 data that is static during duration of a frame group and the PLS2 dynamic data may be PLS2 data that is dynamically changed every frame.

The PLS2 data may include FIC_FLAG information. A fast information channel (FIC) may be a dedicated channel for transmitting cross-layer information for enabling fast service acquisition and channel scanning. The FIC_FLAG information may indicate whether a fast information channel (FIC) is used in a current frame group via a 1-bit field. When a value of the corresponding field is set to 1, the FIC may be provided in the current frame. When a value of the corresponding field is set to 0, the FIC may not be transmitted in the current frame. The BICM block 1010 may include a BICM block for protecting PLS data. The BICM block for protecting the PLS data may include a PLS FEC encoder, a bit interleaver, and a constellation mapper.

The PLS FEC encoder may include a scrambler for scrambling PLS1 data and PLS2 data, a BCH encoding/zero inserting block for performing external encoding on the scrambled PLS 1 and 2 data using a BCH code shortened for PLS protection and inserting a zero bit after BCH encoding, a LDPC encoding block for performing encoding using an LDPC code, and an LDPC parity puncturing block. Only the PLS1 data may be permutated before an output bit of zero insertion is LDPC-encoded. The bit interleaver may interleave each of the shortened and punctured PLS1 data and PLS2 data, and the constellation mapper may map the bit-interleaved PLS1 data and PLS2 data to constellation.

A broadcast signal reception device of a next-generation broadcast service according to an embodiment of the present invention may perform a reverse operation of the broadcast signal transmission device of the next-generation broadcast service that has been described with reference to FIG. 8.

The broadcast signal reception device of a next-generation broadcast service according to an embodiment of the present invention may include a synchronization & demodulation module for performing demodulation corresponding to a reverse operation performed by the broadcast signal transmission device, a frame parsing module for parsing an input signal frame to extract data transmitted by a service selected by a user, a demapping & decoding module for converting an input signal into bit region data, deinterleaving bit region data as necessary, performing demapping on mapping applied for transmission efficiency, and correcting error that occurs in a transmission channel for decoding, an output processor for performing a reverse operation of various compression/signal processing procedures applied by the broadcast signal transmission device, and a signaling decoding module for acquiring and processing PLS information from the signal demodulated by the synchronization & demodulation module. The frame parsing module, the demapping & decoding module, and the output processor may perform the functions using the PLS data output from the signaling decoding module.

Hereinafter, the timer interleaver will be described. A time interleaving group according to an embodiment of the present invention may be directly mapped to one frame or may be spread over $P_I$ frames. In addition, each time interleaving group may be divided into one or more ($N_{TI}$) time interleaving blocks. Here, each time interleaving block may correspond to one use of a time interleaver memory. A time interleaving block in the time interleaving group may include different numbers of XFECBLOCK. In general, the time interleaver may also function as a buffer with respect to data pipe data prior to a frame generation procedure.

The time interleaver according to an embodiment of the present invention may be a twisted row-column block interleaver. The twisted row-column block interleaver according to an embodiment of the present invention may write a first XFECBLOCK in a first column of the time interleaving memory, write a second XFECBLOCK in a next column, and write the remaining XFECBLOCKs in the time interleaving block in the same manner. In an interleaving array, a cell may be read in a diagonal direction to a last row from a first row (a leftmost column as a start column is read along a row in a right direction). In this case, to achieve single memory deinterleaving at a receiver side irrespective of the number of XFECBLOCK in the time interleaving block, the interleaving array for the twisted row-column block interleaver may insert a virtual XFECBLOCK into the time interleaving memory. In this case, to achieve single memory deinterleaving at a receiver side, the virtual XFECBLOCK needs to be inserted into another frontmost XFECBLOCK.

Figure 9:
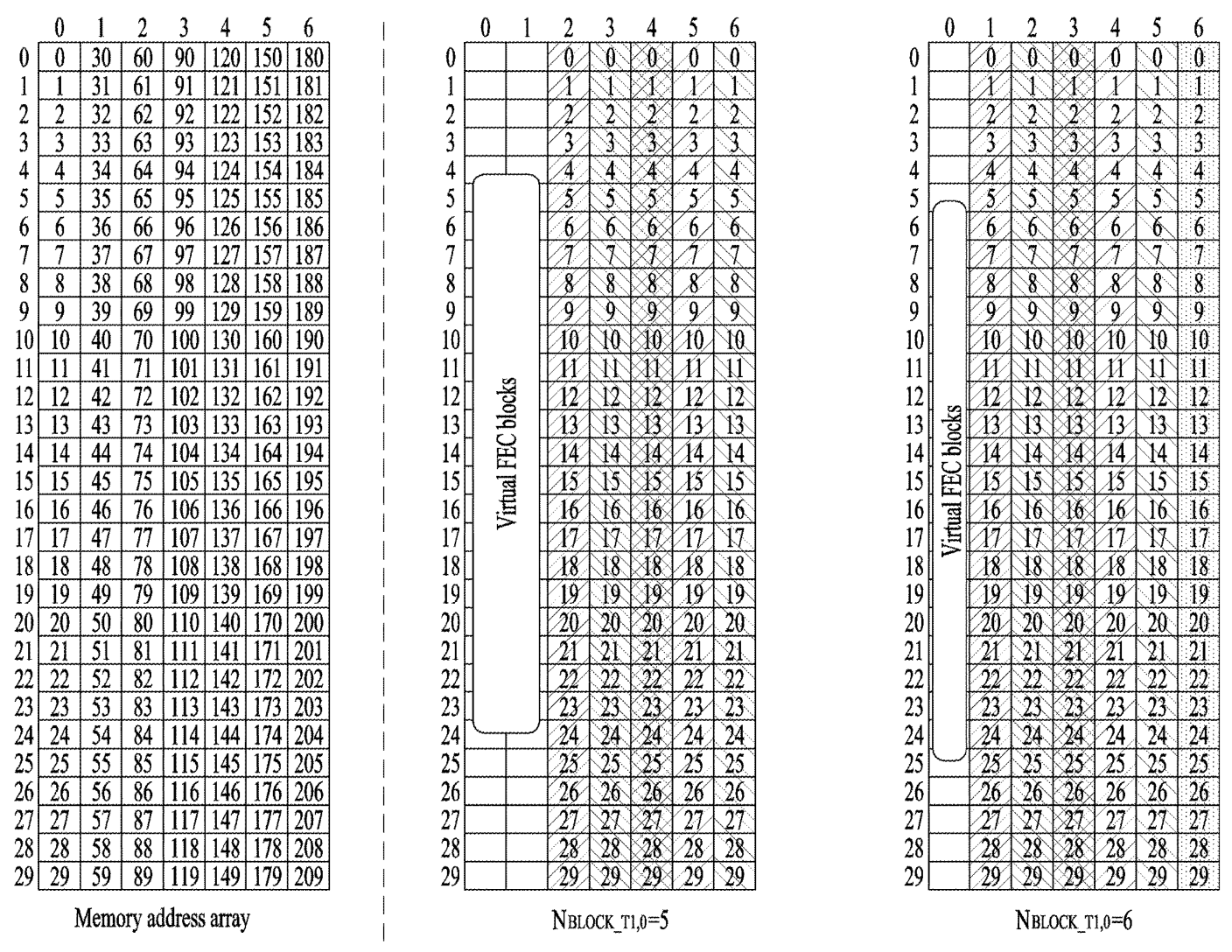

FIG. 9 is a diagram showing a writing operation of a time interleaver according to an embodiment of the present invention.

A block shown in a left portion of the drawing shows a TI memory address array and a block sho7wn in a right portion of the drawing shows a writing operation when two or one virtual FEC blocks are inserted into a frontmost group of TI groups with respect to two consecutive TI groups.

The frequency interleaver according to an embodiment of the present invention may include an interleaving address generator for generating an interleaving address to be applied to data corresponding to a symbol pair.

Figure 10:
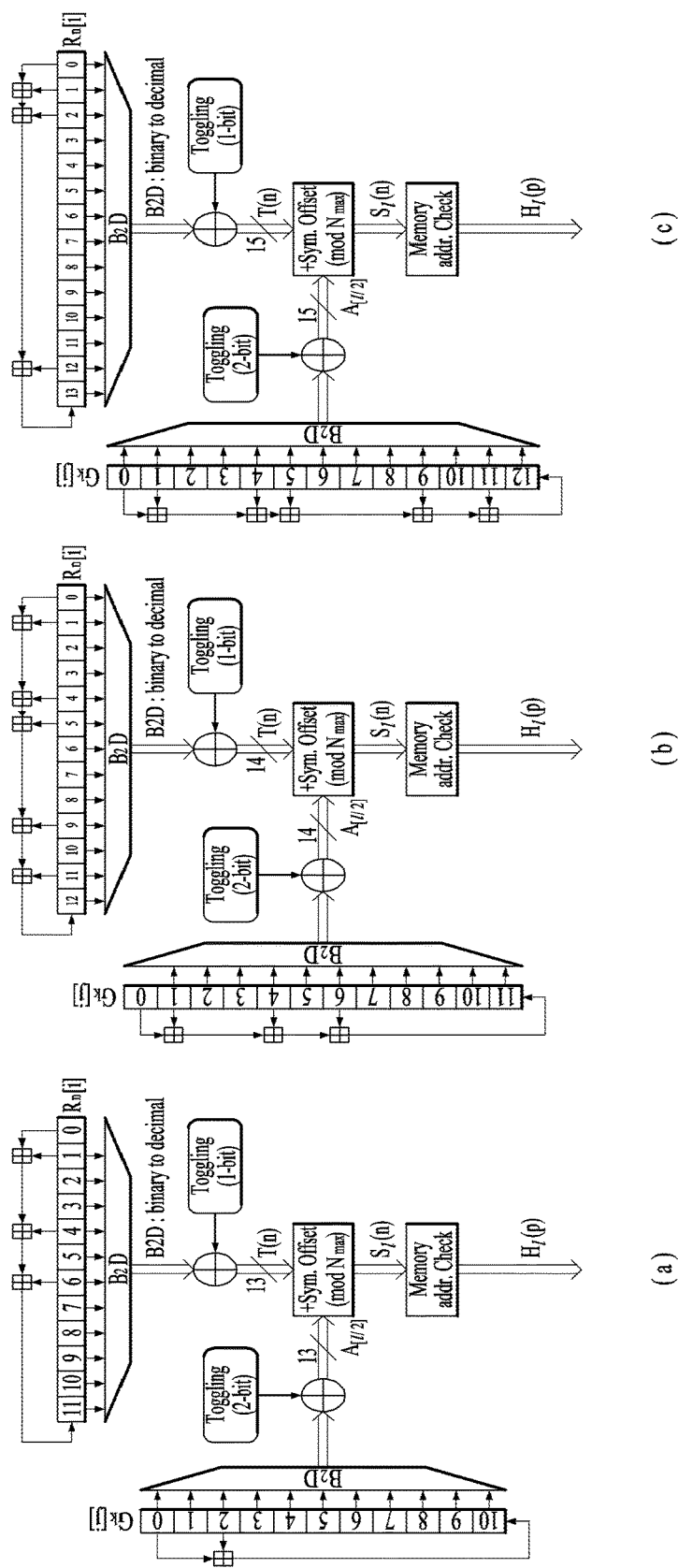
FIG. 10 is a block diagram of an interleaving address generator including a main-PRBS generator and a sub-PRBS generator according to each FFT mode, included in the frequency interleaver, according to an embodiment of the present invention.

FIG. 10 is a block diagram of an interleaving address generator including a main-PRBS generator and a sub-PRBS generator according to each FFT mode, included in the frequency interleaver, according to an embodiment of the present invention.

(a) is a block diagram of an interleaving address generator with respect to a 8K FFT mode, (b) is a block diagram of an interleaving address generator with respect to a 16K FFT mode, and (c) is a block diagram of an interleaving address generator with respect to a 32K FFT mode.

An interleaving procedure with respect to an OFDM symbol pair may use one interleaving sequence and will be described below. First, an available data cell (output cell from a cell mapper) to be interleaved in one OFDM symbol $O_{m,l}$ may be defined as $O_{m,l}=[x_{m,l,0}, \ldots, x_{m,l,p}, \ldots, x_{m,l,Ndata-1}]$ with respect to l=0, . . . , $N_{sym}-1$. In this case, $x_{m,l,p}$ may be a $p^{th}$ cell of a $l^{th}$ OFDM symbol in a $m^{th}$ frame and $N_{data}$ may be the number of data cells. In the case of a frame signaling symbol, $N_{data}=C_{FSS}$, in the case of normal data, $N_{data}=C_{data}$, and in the case of a frame edge symbol, $N_{data}=C_{FES}$. In addition, the interleaving data cell may be defined as $P_{m,l}=[v_{m,l,0}, \ldots, v_{m,l,Ndata-1}]$ with respect to l=0, . . . , $N_{sym}-1$.

With respect to an OFDM symbol pair, an interleaved OFDM symbol pair may be given according to $v_{m,l,Hi(p)}=x_{m,l,p}$, p=0, . . . , $N_{data}-1$ for a first OFDM symbol of each pair and given according to $v_{m,l,p}=x_{m,l,Hi(p)}$, p=0, . . . , $N_{data}-1$ for a second OFDM symbol of each pair. In this case, $H_l(p)$ may be an interleaving address generated based on a cyclic shift value (symbol offset) of a PRBS generator and a sub-PRBS generator.

Figure 11:
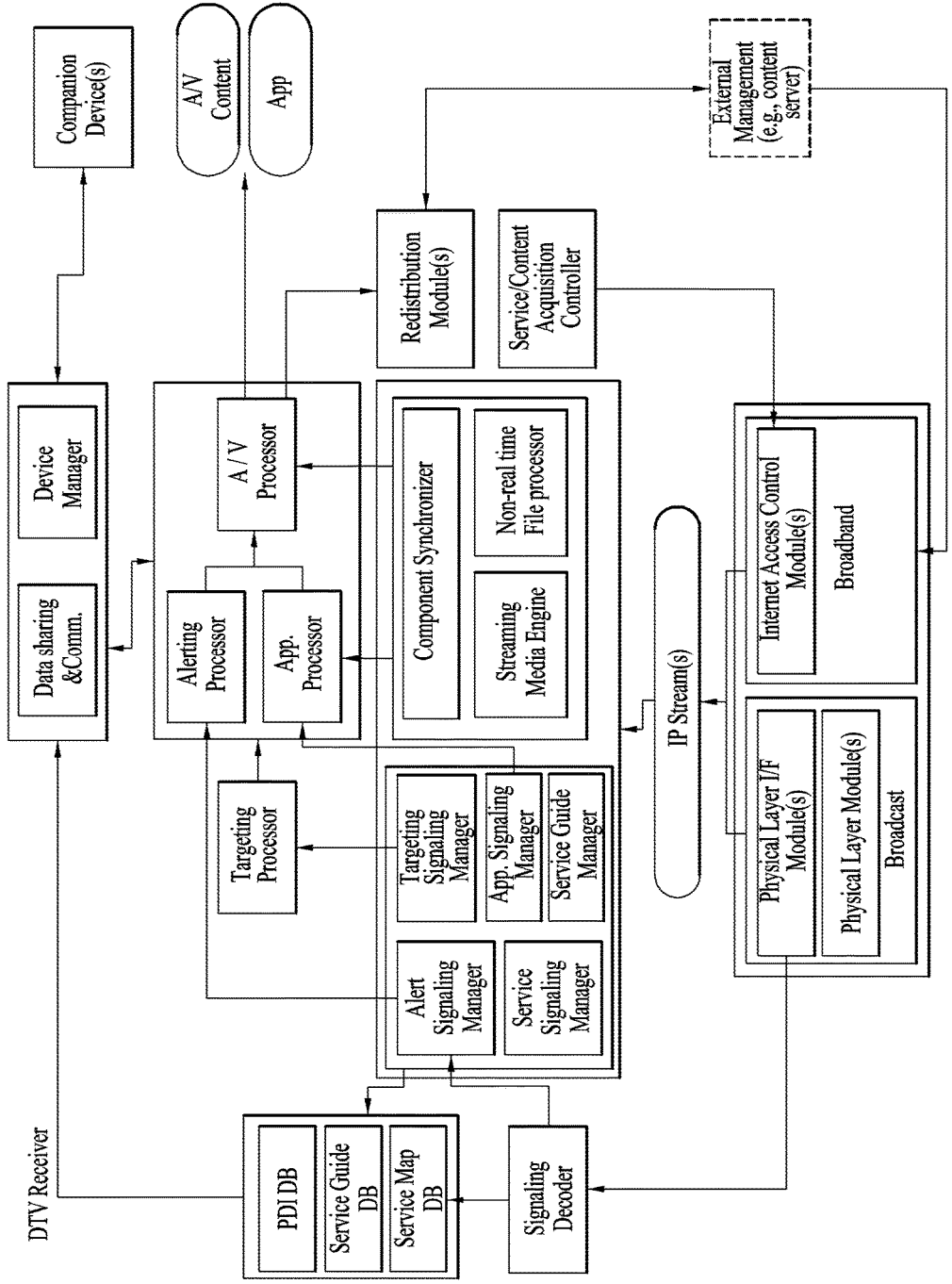
FIG. 11 is a block diagram illustrating a hybrid broadcast reception apparatus according to an embodiment of the present invention.

FIG. 11 is a block diagram illustrating a hybrid broadcast reception apparatus according to an embodiment of the present invention.

A hybrid broadcast system can transmit broadcast signals in connection with terrestrial broadcast networks and the Internet. The hybrid broadcast reception apparatus can receive broadcast signals through terrestrial broadcast networks (broadcast networks) and the Internet (broadband). The hybrid broadcast reception apparatus may include physical layer module(s), physical layer I/F module(s), service/content acquisition controller, Internet access control module(s), a signaling decoder, a service signaling manager, a service guide manager, an application signaling manager, an alert signal manager, an alert signaling parser, a targeting signaling parser, a streaming media engine, a non-real time file processor, a component synchronizer, a targeting processor, an application processor, an A/V processor, a device manager, a data sharing and communication unit, redistribution module(s), companion device(s) and/or an external management module.

The physical layer module(s) can receive a broadcast related signal through a terrestrial broadcast channel, process the received signal, convert the processed signal into an appropriate format and deliver the signal to the physical layer I/F module(s).

The physical layer I/F module(s) can acquire an IP datagram from information obtained from the physical layer module. In addition, the physical layer I/F module can convert the acquired IP datagram into a specific frame (e.g., RS frame, GSE, etc.).

The service/content acquisition controller can perform control operation for acquisition of services, content and signaling data related thereto through broadcast channels and/or broadband channels.

The Internet access control module(s) can control receiver operations for acquiring service, content, etc. through broadband channels.

The signaling decoder can decode signaling information acquired through broadcast channels.

The service signaling manager can extract signaling information related to service scan and/or content from the IP datagram, parse the extracted signaling information and manage the signaling information.

The service guide manager can extract announcement information from the IP datagram, manage a service guide (SG) database and provide a service guide.

The application signaling manager can extract signaling information related to application acquisition from the IP datagram, parse the signaling information and manage the signaling information.

The alert signaling parser can extract signaling information related to alerting from the IP datagram, parse the extracted signaling information and manage the signaling information.

The targeting signaling parser can extract signaling information related to service/content personalization or targeting from the IP datagram, parse the extracted signaling information and manage the signaling information. In addition, the targeting signaling parser can deliver the parsed signaling information to the targeting processor.

The streaming media engine can extract audio/video data for A/V streaming from the IP datagram and decode the audio/video data.

The non-real time file processor can extract NRT data and file type data such as applications, decode and manage the extracted data.

The component synchronizer can synchronize content and services such as streaming audio/video data and NRT data.

The targeting processor can process operations related to service/content personalization on the basis of the targeting signaling data received from the targeting signaling parser.

The application processor can process application related information and downloaded application state and represent parameters.

The A/V processor can perform audio/video rendering related operations on the basis of decoded audio/video data and application data.

The device manager can perform connection and data exchange with external devices. In addition, the device manager can perform operations of managing external devices connectable thereto, such as addition/deletion/update of the external devices.

The data sharing and communication unit can process information related to data transmission and exchange between a hybrid broadcast receiver and external devices. Here, data that can be transmitted and exchanged between the hybrid broadcast receiver and external devices may be signaling data, A/V data and the like.

The redistribution module(s) can acquire information related to future broadcast services and content when the broadcast receiver cannot directly receive terrestrial broadcast signals. In addition, the redistribution module can support acquisition of future broadcast services and content by future broadcast systems when the broadcast receiver cannot directly receive terrestrial broadcast signals.

The companion device(s) can share audio, video or signaling data by being connected to the broadcast receiver according to the present invention. The companion device may be an external device connected to the broadcast receiver.

The external management module can refer to a module for broadcast services/content provision. For example, the external management module can be a future broadcast services/content server. The external management module may be an external device connected to the broadcast receiver.

Figure 12:
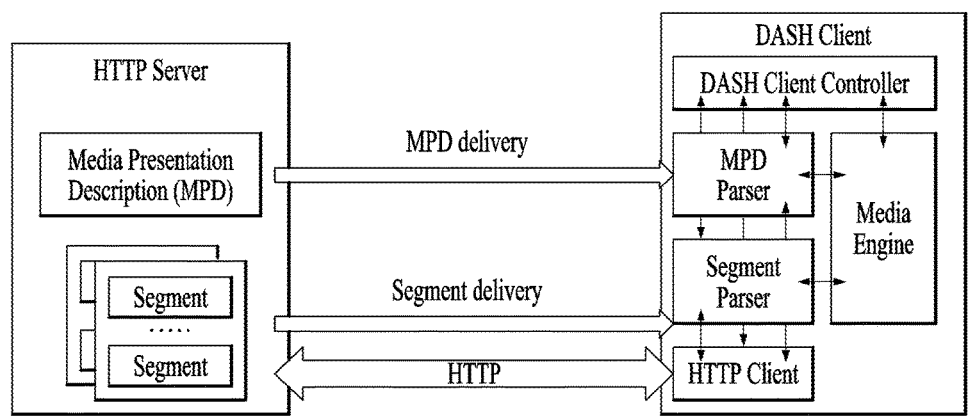
FIG. 12 is a diagram showing an overall operation of a DASH-based adaptive streaming model according to an embodiment of the present invention.

FIG. 12 is a diagram showing an overall operation of a DASH-based adaptive streaming model according to an embodiment of the present invention.

The present invention proposes a next-generation media service providing method for providing high dynamic range (HDR) supportable content. The present invention proposes related metadata and a method of transmitting the metadata when HDR content for expressing sufficient brightness is provided. Thereby, content may be adaptively adjusted according to characteristics of various scenes of content and image quality with enhanced content may be provided.

In the case of UHD broadcast, etc., brightness that is not capable of being expressed by existing content, thereby providing sense of high realism. By virtue of introduction of HDR, an expression range of brightness of a content image is increased and, thus, a difference between characteristics for respective scenes of content may be increased compared with a previous case. To effectively express characteristics for respective scenes of content on a display, metadata may be defined and transmitted to a receiver. An image of content may be appropriately provided according to intention of a service provider based on the metadata received by the receiver.

The DASH-based adaptive streaming model according to the illustrated embodiment may write an operation between an HTTP server and a DASH client. Here, a dynamic adaptive streaming over HTTP (DASH) may be a protocol for supporting HTTP-based adaptive streaming and may dynamically support streaming according to a network situation. Accordingly, AV content reproduction may be seamlessly provided.

First, the DASH client may acquire MPD. The MPD may be transmitted from a service provider such as a HTTP server. The MPD may be transmitted according to delivery according to the aforementioned embodiment. The DASH client may request a server of corresponding segments using access information to a segment described in the MPD. Here, the request may reflect a network state and may be performed.

The DASH client may acquire a corresponding segment and, then, process the segment in a media engine and, then, display the segment on a screen. The DASH client may reflect a reproduction time and/or a network situation in real time and make a request for and acquire a required segment (Adaptive Streaming). Thereby, content may be seamlessly reproduced.

The media presentation description (MPD) may be represented in the form of XML as a file containing detailed information for permitting the DASH client to dynamically acquire a segment. In some embodiments, the MPD may be the same as the aforementioned MPD.

A DASH client controller may reflect a network situation to generate a command for making a request for MPD and/or a segment. The controller may control the acquired information to be used in an internal block such as a media engine.

A MPD parser may parse the acquired MPD in real time. Thereby, the DASH client controller may generate a command for acquiring a required segment.

A segment parser may parse the acquired segment in real time. Internal blocks such as a media engine may perform a specific operation according to information included in a segment.

A HTTP client may make a request for required MPD and/or segment to a HTTP server. The HTTP client may transmit the MPD and/or segments acquired from the server to the MPD parser or the segment parser.

The media engine may display content on a screen using media data included in a segment. In this case, information of the MPD may be used.

Figure 13:
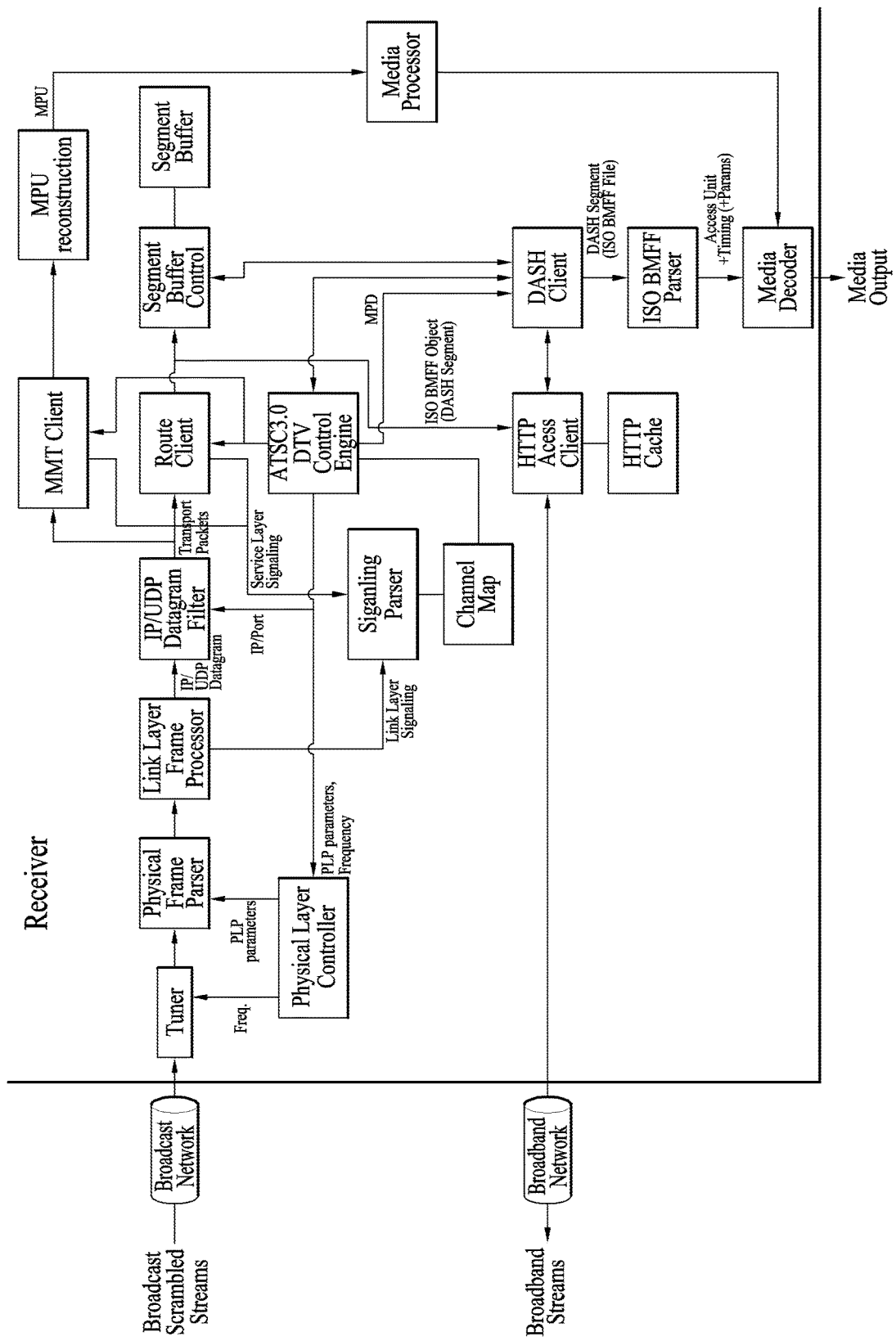
FIG. 13 is a block diagram of a receiver according to an embodiment of the present invention.

FIG. 13 is a block diagram of a receiver according to an embodiment of the present invention.

The receiver according to the illustrated embodiment may include a tuner, a physical layer controller, a physical frame parser, a link layer frame processor, an IP/UDP datagram filter, a DTV control engine, a route client, a segment buffer control, an MMT client, an MPU reconstruction, a media processor, a signaling parser, a DASH client, an ISO BMFF parser, a media decoder, and/or an HTTP access client. Each detailed block of the receiver may be a hardware processor.

The tuner may receive and process a broadcast signal through a terrestrial broadcast channel to tune the broadcast signal in a proper form (physical frame, etc.). The physical layer controller may control operations of the tuner, the physical frame parser, etc. using RF information, etc. of a broadcast channel as a reception target. The physical frame parser may parse the received physical frame and acquire a link layer frame, etc. via processing related to the physical frame.

The link layer frame processor may acquire link layer signaling, etc. from the link layer frame or may acquire IP/UDP datagram and may perform related calculation. The IP/UDP datagram filter may filter specific IP/UDP datagram from the received IP/UDP datagram. The DTV control engine may mange an interface between components and control each operation via transmission of a parameter, etc.

The route client may process a real-time object delivery over unidirectional transport (ROUTE) packet for supporting real-time object transmission and collect and process a plurality of packets to generate one or more base media file format (ISOBMFF) objects. The segment buffer control may control a buffer related to segment transmission between the route client and the dash client.

The MMT client may process a MPEG media transport (MMT) transport protocol packet for supporting real-time object transmission and collect and process a plurality of packets. The MPU reconstruction may reconfigure a media processing unit (MPU) from the MMTP packet. The media processor may collect and process the reconfigured MPU.

The signaling parser may acquire and parse DTV broadcast service related signaling (link layer/service layer signaling) and generate and/or manage a channel map, etc. based thereon. This component may process low level signaling and service level signaling.

The DASH client may perform real-time streaming or adaptive streaming related calculation and process the acquired DASH segment, etc. The ISO BMFF parser may extract data of audio/video, a related parameter, and so on from the ISO BMFF object. The media decoder may process decoding and/or presentation of the received audio and video data. The HTTP access client may make a request for specific information to the HTTP server and process response to the request.

The present invention can provide a method of converting content into images with improved definition and representing the images by transmitting a factor which can adaptively adjust the content for various scene properties included in the content to a receiver when high dynamic range (HDR) content is provided. UHD broadcast is discriminated from conventional broadcast by presenting a dynamic range that cannot be achieved in conventional content and can provide a high degree of realism. As the dynamic range of images increases according to introduction of HDR, a property difference between scenes included in content may increase. Accordingly, a broadcast transmission device can additionally provide information for effectively presenting properties of each scene and a reception device can provide video effects based on information transmitted thereto to present images through a method which can satisfy the intention of a producer.

UHD broadcasting can provide enhanced definition and immersiveness to viewers through various methods, compared to HD broadcasting. To this end, a method of extending a dynamic range and a color gamut presented in content can be provided in UHD broadcasting. That is, HDR (High Dynamic Range) and WCG (Wide Color Gamut) can be applied to UHD content. That is, enhanced contrast and colors of content can be provided such that a user who views UHD content can experience enhanced immersiveness and realism. The present invention presents a method of effectively presenting a dynamic range and colors according to the intention of a producer when content is displayed through a display such that a user can view images with enhanced definition.

The aforementioned broadcast signal may include broadcast service data and the broadcast service data may include video data and additional data. Here, the additional data may be caption data with respect to video data. A method of providing a digital broadcast captioning service using XML subtitles will be described. As an embodiment of the present invention, a method of transmitting XML subtitles on the basis of MPEG-2 TS and particularly transmitting XML subtitles using multiple PIDs will be described.

TTML (Time Text Markup Language), EBU-TT (EBU Time Text) and the like can be exemplified as standards for XML subtitles. XML subtitles can provide a captioning service in a media and IP streaming environment. In addition, XML subtitles may be used in broadcast services. XML subtitles have the advantage that an integrated subtitle source can be used for various broadcast environments. In addition, XML subtitles can be adaptively used in various service environments on the basis of the same subtitle source. For example, the same subtitle can be applied to services having different definitions and services having different aspect ratios. Further, XML subtitles can also be applied to hybrid broadcast services as well as media, IP stream and broadcast services on the basis of a single subtitle source.

Figure 14:
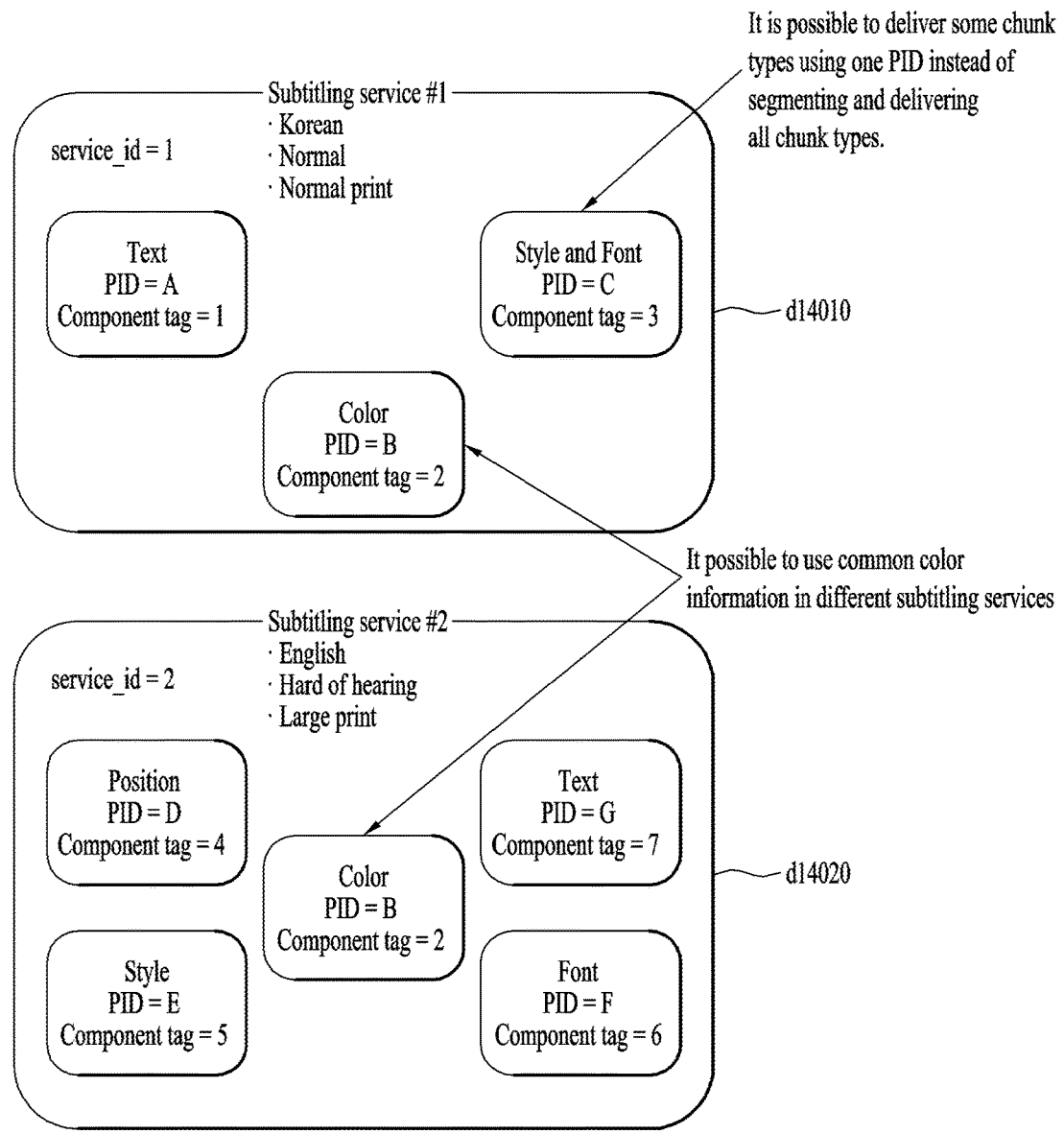
FIG. 14 is a diagram showing a method of configuring a subtitling service according to an embodiment of the present invention.

FIG. 14 is a diagram showing a method of configuring a subtitling service according to an embodiment of the present invention. The subtitling service may include at least one subtitle component and such subtitle components may be classified into at least one chunk type. For example, in the upper part d14010 of the figure, subtitling service #1 has service_id set to 1 and includes Korean subtitles having a normal size for normal viewers. Such subtitling service #1 may include subtitle components such as text, color, style, and font which can be classified into at least one chunk type. The text component may have a PID set to A and a component tag set to 1. The component tag can indicate a PID of a subtitle connected to the text component. That is, different component_tag values can be set for subtitle components classified with different PIDs in a PMT. The color component may have a PID set to B and a component tag set to 2. The style and font components may have a PID set to C and a component tag set to 3. In this manner, subtitle components can be transmitted along with different PID values. According to an embodiment, the style component and the font component may be assigned to one PID and transmitted. That is, chunk types may be delivered using individual PIDs or some chunk types may be delivered using one PID.

In the lower part d14030 of the figure, subtitling service #2 has a service_id set to 2 and includes English subtitles in a large font for hard of hearing viewers. Such subtitling service #2 can include subtitle components such as position, style, color, text and font. The position component may have a PID set to D and a component tag set to 4. The style component may have a PID set to E and a component tag set to 5. The color component may have a PID set to B and a component tag set to 2 which are the same as those of color information in the aforementioned subtitling service #1. According to an embodiment of the present invention, common color information can be used in different subtitling services. This embodiment is not limited to the color component and can be applied to other components. The font component may have a PID set to F and a component tag set to 6. The text component may have a PID set to G and a component tag set to 7. In this manner, subtitle components can be transmitted along with different PID values.

FIG. 15 is a diagram showing a configuration of a PMT (Program Map Table). The PMT provides mapping between a program number and a program element. To provide a subtitling service, subtitle related descriptors can be included in the PMT and delivered.

The PMT may include a table_id field, a section_syntax_indicator field, a section_length field, a program_number field, a version_number field, a current_next_indicator field, a section_number field, a last_section_number field, a PCR_PID field, a program_info_length field, N service related descriptors, a stream_type field, an elementary_PID field, an ES_info_length field, each PID related descriptor and/or a CRC_32 field.

The table_id field is an 8-bit field and TS_program_map_section is set to 0x02. The section_syntax_indicator field is 1 bit and is set to 1. The section_length field is 12 bits and the first two bits are 00. This field indicates the number of bytes of the corresponding section and represents the length from this field to CRC. The value of this field does not exceed 1021. The program_number field is 16 bits and indicates a program to which program_map_PID is applicable. One program definition is delivered by only one TS_program_map_section, which implies that a program definition cannot exceed 1016. The version_number field is a 5-bit field and indicates the version of the TS_program_map section. This field increases by 1 whenever the TS_program_map section is changed. When the version value reaches 31, the next version value becomes 0. The current_next_indicator field is a 1-bit field and is set to 1 when the TS_program_map section is currently applicable. If the current_next_indicator field is set to 0, this represents that the TS_program_map section cannot be applied and the next TS_program_map section is valid. The section_number field is set to 0x00. The last_section_number field is set to 0x00. The PCR_PID field is a 13-bit field and refers to a PID of a TS packet including a PCR field valid for a program specified by a program number. The program_info_length field is a 12-bit field and the first two bits are 00 and the remaining bits represent the number of bytes of descriptors following this field. The descriptor following the program_info_length field may include a subtitling_service_list_descriptor( ) which can signal a combination of components of a subtitle. The subtitling_service_list_descriptor( ) will be described in detail later. The stream_type field is an 8-bit field which can specify the type of a program element transmitted through a packet having a PID value specified by elementary_PID. In one embodiment of the present invention, the stream_type field may have a value of 0x06 which can indicate Rec. ITU-T H.222.0/ISO/IEC 13818-1 PES packets containing private data. Here, an XML subtitle may be included as private data. The elementary_PID field is a 13-bit field which can specify a PID of TS packets including related program elements. As described above, the elementary_PID can classify subtitle components of a subtitling service with multiple PIDs and deliver the subtitle components. The ES_info_length field is a 12-bit field, and the first two bits are 00 and the remaining 10 bits can specify the number of bytes of descriptors of related program elements, which follow this field. The descriptor following the ES_info_length field may include an XML_subtitling_descriptor ( ) according to the present invention, which will be described in detail later. The CRC_32 field is a 32-bit field and may include a CRC value that causes zero output of registers in a decoder.

FIG. 16 shows a list descriptor for subtitling services according to an embodiment of the present invention. The subtitling_service_list_descriptor is a program-level descriptor for signaling a combination of subtitle components delivered using multiple PIDs. As shown in d16010, the subtitling_service_list_descriptor may include a descriptor_tag field, a descriptor_length field, a num_of_subtitling_services field, a service_id field, a number_of_components field, a subtitling_type field, a combination_of_chunk_types field and/or a component_tag field.

The descriptor_tag field can be used as a field that identifies each descriptor. This field can indicate that the corresponding descriptor is the subtitling service list descriptor. The descriptor_length field can specify the number of bytes of the descriptor following the descriptor_length field. The num_of_subtitling_services field can indicate the number of subtitling services. Here, each subtitling service may include a combination of subtitle components delivered using multiple PIDs. The service_id field serves as an identifier for identifying different subtitle services. That is, the service_id field can be set to be the same as service_id of XML_subtitling_descriptor.

The subtitling_type field may include the same values as those indicated by stream_content, (stream_content_ext), and component_type of component_descriptor. For example, the subtitling_type field can classify subtitle types into EBU-TT-D subtitles and DVB subtitles (for the hard of hearing) with timed text (e.g., EBU-TT-D subtitle). The combination_of_chunk_types field signals a combination of subtitling_chunk_types of the XML_subtitling_descriptor( ). As shown in d16020, a combination of chunk types can be signaled using a mask bit. That is, when there are multiple chunk types classified as one subtitle component, a combination of these chunk types can be signaled. The component_tag field signals the PID of a subtitle connected to the corresponding subtitle component. That is, subtitle components classified into different PIDs have different component_tag values in the PMT.

FIG. 17 shows an XML subtitling descriptor according to an embodiment of the present invention. The XML subtitle descriptor is elementary stream level signaling for signaling XML subtitles. An XML_subtitling_descriptor, which is different from the subtitling_descriptor used in the conventional DVB subtitle service, may be newly defined and signaled through a PMT as a method for delivering service information about XML subtitles. Here, different components may be delivering using different PIDs. When different PIDs are set for respective components in this manner, an unnecessary subtitle component may be discarded or skipped at the system decoder level. In this case, if the user wants to view content using another subtitle, the system decoder needs to select a subtitle corresponding to another PID.

As shown in d17010, the XML subtitling descriptor may include a descriptor_tag field, a descriptor_length field, an ISO_639_language_code field, a subtitling_type field, a subtitling_purpose field, a subtitling_read_mode field and/or a subtitling_chunk_type field. In addition, the XML subtitling descriptor may further include an essential_font_download_flag. The essential_font_download_flag can indicate whether the corresponding font is essential for download.

The descriptor_tag field can be used to identify each descriptor. This field can indicate that the corresponding descriptor is an XML subtitling descriptor. The descriptor_length field can specify the number of bytes of the descriptor following the descriptor_length field. The ISO_639_language_code field is a 24-bit code indicating the language of the corresponding subtitle. The language of the XML subtitle can be represented using this field. The subtitling_type field may include the same values as those represented by the stream_content, (stream_content_ext) and component_type of the component_descriptor. For example, the subtitling_type field can classify subtitle types into EBU-TT-D subtitles and DVB subtitles (for the hard of hearing) with timed text (e.g., EBU-TT-D subtitle). The subtitling_purpose field is a field including the purpose of a subtitle and can be classified into a normal subtitle which refers to translation and is delivered to normal viewers and hard-of-hearing delivered to disabled viewers. The subtitling_read_mode field can be divided into normal print and large print. Here, the large print refers to a method of selectively providing only subtitles that are easily read instead of all texts constituting subtitles. The subtitling_purpose field and the subtitling_read_mode field may be signaled as one field. The subtitling_chunk_type field may include signaling of text representing a subtitle, position information representing a position at which the subtitle is disposed, style, font or color information of the text, and TTS (text-to-speech) metadata. Size information can represent information about a subtitle size. For example, the size information can indicate one of default, small, medium and large. The position information can indicate the position of the corresponding subtitle in a screen. For example, the position information can indicate one of top, bottom and close to the speaker's mouse. The color information can indicate color information of the subtitle or whether the subtitle is monochrome. The TTS metadata information can indicate whether the corresponding subtitle is suitable for TTS. The style information of the text can represent whether the text is bold or italic. The subtitling_chunk_type can indicate types of signaling information according to values thereof as shown in d17020.

FIG. 18 shows an XML subtitling descriptor according to another embodiment of the present invention. Multiple subtitling_chunk_types of the XML_subtitling_descriptor( ) may be simultaneously transmitted according to an embodiment. In this case, signaling as shown in d18010 may be performed. Here, chunk types may be classified according to segment and corresponding detailed information may be transmitted. That is, the XML_subtitling_descriptor( ) may further include a num_of_chunk_types field and a plurality of subtitling_chunk_type fields in addition to the aforementioned fields. The num_of_chunk_types field can indicate the number of subtitling_chunk_types simultaneously delivered in the XML_subtitling_descriptor( ) and as many subtitling_chunk_types as the number indicated by the num_of chunk_types field can be included in the XML_subtitling_descriptor( ).

Alternatively, the subtitling_descriptor d18020 used in the conventional DVB subtitling service may be extended and signaled through a PMT. This signaling structure is used when subtitles having different configurations are delivered using one PID, which is an embodiment different from the above-described embodiment of delivering subtitles using multiple PIDs. The extended subtitling_descriptor d18030 may include a descriptor_tag field, a descriptor_length field, an ISO_639_language_code field, a subtitling_type field, a subtitling_purpose field, a subtitling_read_mode field and/or a subtitling_chunk_type field. These fields have been described above. The newly defined extended subtitling_descriptor d18030 may modify the meanings of the fields of the conventional DVB subtitling_descriptor( ) and use the fields. That is, the subtitling_purpose field, the subtitling_read_mode field and the subtitling_chunk_type field may be added to the conventional DVB subtitling_descriptor d18020 and such DVB subtitling_descriptor may be used as a newly defined subtitling_descriptor. Furthermore, the conventional composition_page_id field and ancillary_page_id field may be deleted according to an embodiment.

FIG. 19 is a diagram showing a PES_data_field including an XML_subtitling_segment according to an embodiment of the present invention. Subtitle data according to an embodiment of the present invention may be transmitted through a PES packet. When a subtitle stream is delivered, PES_packet_data_byte is encoded into the PES_data_field. The PES_data_field has the structure of d19010. That is, one PES includes multiple segments. The PES_data_field( ) shown in d19010 of FIG. 19 may include a data identifier field, a subtitle_stream_id field, a total_number_of segments field, an XML_subtitling_segment( ) field and/or an end_of_PES_data_field_marker field.

The data_identifier field indicates that corresponding data is a subtitle stream. The subtitle_stream_id field identifies the type of an XML subtitle stream. The total_number_of_segments field can indicate the number of segments included in the PES. The XML_subtitle_segment field is a part for delivering an XML subtitle element. This will be described in detail below. The end_of_PES_data_field_marker field is an 8-bit field which indicates the end of the PES data field and has a value of "1111 1111".

The XML_subtitle_segment( ) may include at least one of the following fields. A sync_byte field is an 8-bit field for identifying a segment and has a value of "0000 1111". When parsing is performed in a PES packet, whether the packet is lost can be verified using the segment length and this field. A subtitle_id field serves as an identifier indicating different subtitle configurations. That is, the subtitle_id field is the same as the service_id of the subtitling_service_list_descriptor( ). A chunk_type field refers to a chunk type in the corresponding subtitle configuration. This field can be set to be the same as the subtitling_chunk_type of the XML_subtitling_descriptor( ). A chunk_instance_id field can indicate an identifier of each instance when one or more instances are present in the same chunk_type. Here, a chunk_type and a chunk_instance have a relationship therebetween in which chunk_instance_id identifies style 1, style 2, . . . when the chunk_type is style. A combination of multiple chunk_types can be identified using subtitle_id. A chunk_instance_version field can indicate version information of subtitle chunks having the same chunk_type and chunk_instance_id. A segmentation_type field represents a method of segmenting a subtitle chunk into segments. For example, the segmentation_type field indicates a whole XML subtitle including both the head and body when set to "0001", indicates an XML subtitle including only the head when set to "0010", and indicates an XML subtitle including only the body when set to "0011". A specific embodiment with respect to the segmentation_type field will be described later. A segment_number field signals a segment number. That is, the segment_number field can signal the number of segments and the number of a segment among the segments using a segment_total_num (total_number_of_segments) and segment_number. A last_segment_number field can signal the number of the last segment. A receiver can recognize the number of the current segment through the total_number_of segments, segment_number and last_segment_number fields. A segment_coding_type field can represent a delivery type of data delivered through a segment. For example, the segment_coding_type field can represent unicode, run length coding of strings, gzip, etc. A segment_length field indicates the length of a data_code. A segment_data_field indicates XML subtitle information configured in XML. The segment_data_field may have different syntaxes according to values of the chunk_type field.

FIG. 20 shows a method of dividing a subtitle packet into segments according to an embodiment of the present invention. A subtitle PES packet may be divided into segments as follows according to the present invention. In a first embodiment, the subtitle PES packet may be divided into one head and one body as shown in d20010. That is, subtitle_chunk_types such as style, font, color and the like can be included in one head and the text can be included in the body. In a second embodiment, the subtitle PES packet can be divided into multiple heads and one body as shown in d20020. That is, subtitle_chunk_types can be divided into segments and delivered. For example, subtitle_chunk_type style, subtitle_chunk_type font and subtitle_chunk_type color can be respectively included in segment 1, segment 2 and segment 3 and delivered. The text corresponding to subtitle data can be included in the body. In a third embodiment, the PES packet may be divided into multiple segments, and one segment may include at least one chunk_type and detailed information according to chunk_type. That is, subtitle_chunk_type style and position may be included in segment 1 and subtitle_chunk_type color and font may be included in segment 2 and delivered. That is, multiple segments having multiple subtitle_chunk_types can constitute the head of the subtitle PES packet. The body can include the text corresponding to the subtitle data.

FIG. 21 shows a method of transmitting a subtitle using multiple PIDs according to an embodiment of the present invention. FIG. 21 shows part of the PMT according to an embodiment of the present invention. That is, a subtitle is delivered using multiple PIDs included in the PMT described above with reference to FIG. 15 in the shown embodiment. As shown, a subtitle in Korean having a subtitling purpose of "normal" and a subtitling read mode of "normal print" is configured using style info, color info and font info respectively transmitted through PID A, PID B and PID C. That is, style info, color info and font info which constitute one subtitle can be delivered through the different PIDs A, B and C. A detailed receiver operation related thereto is as follows. The receiver receives the PMT and detects the stream_type. When the stream_type is 0x06, the receiver can recognize that the PES packet includes private data corresponding to a stream including an XML subtitle. The receiver can detect detailed information of the subtitle such as the language type, purpose, read mode and chunk type through the XML_subtitling_descriptor( ) per elementary_PID. The receiver can collect subtitle components corresponding to PIDs and parse the components in an XML parser to acquire the subtitle.

FIG. 22 shows a method of providing signaling with respect to the XML subtitling service according to an embodiment of the present invention. Particularly, FIG. 22 shows an embodiment of providing a DVB subtitling service on the basis of an XML subtitle. Signaling with respect to the subtitling service can be delivered using an EIT (Event Information Table) of DVB SI signaling as shown in d22010.

The EIT may include a table_id field, a section_syntax_indicator field, a section_length field, a service_id field, a version_number field, a current_next_indicator field, a section_number field, a last_section_number field, a transport_stream_id field, an original_network_id field, a segment_last_section_number field, a last table_id field, an event_id field, a start_time field, a duration field, a running_status field, a free_CA_mode field, a descriptors_loop_length field, a descriptor and/or a CRC_32 field.

The table_id field is an 8-bit field and is set to one of 0x4E, 0x4F, 0x50 to 0x5F and 0x60 to 0x6F. The section_syntax_indicator field is a 1-bit field and is set to 1. The section_length field is a 12-bit field and indicates the number of bytes of a section and the length from this field to CRC. The service_id field is a 16-bit field and can be used as a service identifier. The version_number field is a 5-bit field and indicates the version of the corresponding table. This field increases by 1 whenever there is a change in the table. When the version value reaches 31, the next version value becomes 0. The current_next_indicator field is a 1-bit field and is set to 1 when the corresponding table is currently applicable. This field indicates that the table is not applicable and the next table is valid when set to 0. The section_number field is set to 0x00. The last_section_number field can indicate the number of the last section.

The transport_stream_id field is a 16-bit field and can be used as a label for identifying a TS. The original_network_id field can be used as a label for identifying a network_id of a transmission system. The segment_last_section_number field is an 8-bit field and can indicate the number of the last section of the corresponding segment. The last_table_id field is an 8-bit field and can identify the last table_id. The event_id field is a 16-bit field and can include an identification number of a described event. The start_time field is a 40-bit field and can include the start time of an event indicated by universal time, coordinated (UTC) and modified Julian date (MJD). The duration field is a 24-bit field and can indicate the duration of an event in hour, minute and second formats. The running_status field is a 3-bit field and can indicate the status of an event. The free_CA_mode field is a 1-bit field and can indicate whether a component stream of an event has been scrambled. The descriptors_loop_length field is a 12-bit field and can indicate a total length of the following descriptors in bytes. The descriptor can include the above-described subtitling_service_list_descriptor( ) and XML_subtitling_descriptor( ) according to an embodiment of the present invention. Similarly, an SDT (service description table) and/or a CRC_32 field may also include the subtitling_service_list_descriptor and the XML_subtitling_descriptor. The component descriptor shown in d22020 is positioned in a descriptor loop of the EIT (or SDT) and can signal properties of XML subtitle streams included in the corresponding event. The receiver can determine whether the corresponding subtitle can be parsed using this information. Particularly, information about the properties of XML subtitle streams can be signaled using at least one of stream_content_ext, stream_content and component_type fields. When program level signaling is performed, that is, when components are combined without the aforementioned subtitling_service_list_descriptor, a new field, service_id, may be defined in the component descriptor to combine components having the same service_id. In this case, overhead may increase because the receiver needs to check service_ids of all component descriptors. The CRC_32 field is a 32-bit field and can include a CRC value that causes zero output of registers in a decoder.

FIG. 23 is a diagram showing a component descriptor according to an embodiment of the present invention. The component descriptor is positioned in a descriptor loop of the EIT (or SDT) and can signal properties of XML subtitle streams included in the corresponding event. Particularly, the component descriptor can signal information about the properties of XML subtitle streams using at least one of the stream_content_ext, stream_content and component_type fields. That is, the component type can include subtitling type, purpose and read mode fields included in signaling. In a first embodiment, the stream content field of the component descriptor for signaling properties of a subtitle can be set to 0x03 as shown in d23010. The component_type field can signal that subtitle data is EBU teletext subtitles when set to 0x01. Similarly, the component_type field can signal that the subtitle data is associated EBU teletext when set to 0x02, signal that the subtitle data is VBI data when set to 0x03 and signal that the subtitle data is XML subtitle timed text (e.g., EBU-TT-D subtitle) when set to 0x04. 0x00 can be reserved for future use. Matching between the value of each component_type field and subtitle properties may be varied according to embodiments.

In a second embodiment, the stream content field of the component descriptor for signaling properties of a subtitle can be set to 0x03 as shown in d23020. The component_type field can signal that subtitle data is EBU teletext subtitles when set to 0x01. Similarly, the component_type field can signal that the subtitle data is associated EBU teletext when set to 0x02 and signal that the subtitle data is VBI data when set to 0x03. The component_type field can signal that the subtitle data is TTML corresponding to an XML subtitle when set to 0x04, signal that the subtitle data is SMPTE-TT when set to 0x05, signal that the subtitle data is EBU-TT-D when set to 0x06, signal that the subtitle data is EBU-TT when set to 0x07, signal that the subtitle data is CFF-TT when set to 0x08 and signal that the subtitle data is Youview when set to 0x09. Matching between the value of each component_type field and subtitle properties may be varied according to embodiments. 0x00 can be reserved for future use.

In a third embodiment, the stream content field of the component descriptor for signaling properties of an XML subtitle can be set to 0x03 as shown in d23030. The component_type field can signal that subtitle data is EBU teletext subtitles when set to 0x01. Similarly, the component_type field can signal that the subtitle data is a DVB subtitle when set to 0x11 to 0x15 and signal that the subtitle data is DVB subtitles (normal) with timed text when set to 0x16. Here, EBU-TT-D subtitles may be exemplified as the timed text. In addition, the component_type field can signal that the subtitle data is DVB subtitles (for the hard of hearing) with timed text when set to 0x26. Here, EBU-TT-D subtitles may be exemplified as the timed text. That is, the component descriptor according to an embodiment of the present invention can signal the type of an XML subtitle using the stream_content and component_type fields, as described above, and also signal whether the purpose of the corresponding subtitle is normal or hard of hearing.

FIG. 24 is a diagram showing a component descriptor according to another embodiment of the present invention. The component descriptor is positioned in a descriptor loop of the EIT (or SDT) and can signal properties of XML subtitle streams included in a corresponding event. Particularly, the component descriptor can signal information about the properties of XML subtitle streams using at least one of the stream_content_ext, stream_content and component_type fields. In a fourth embodiment, a case in which chunk types constituting a subtitle are delivered through different PIDs can be assumed. Here, the stream content field of the component descriptor for signaling subtitle properties can be set to 0x03 as shown in d24010. The component_type field can signal that XML subtitle data is text when set to 0x41. Similarly, the component_type field can signal "position" when set to 0x42, signal "font" when set to 0x43, signal "style" when set to 0x44 and signal "color" when set to 0x45. The receiver can combine multiple component_descriptors for one subtitle elementary stream to detect properties of the subtitle. Accordingly, the component_type of d24010 can be combined with the component_types of d23010, d23020 and d23030.

For example, component types can be signaled in the formats of d23030 and d24010, and the stream_content can be set to 0x03 and the component_type can be set to 0x16, 0x41 and 0x43. In this case, it is possible to signal that the current subtitle stream is time text having a DVB subtitle purpose of "normal" and the current stream is a subtitle stream including text and font information, as shown in d24020.

Figure 25:
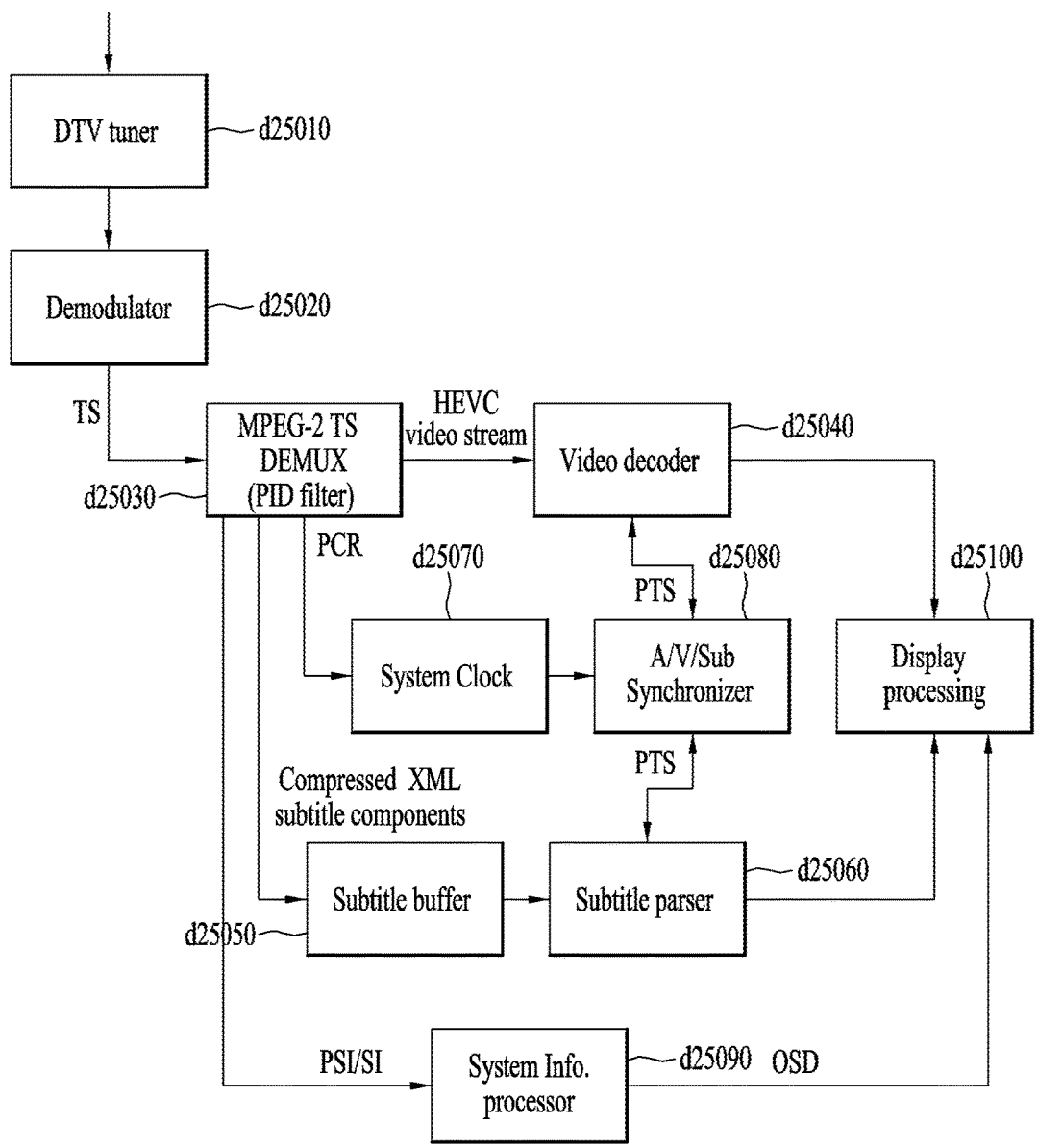
FIG. 25 is a diagram showing a device for receiving a broadcast signal according to an embodiment of the present invention.

FIG. 25 is a diagram showing a device for receiving a broadcast signal according to an embodiment of the present invention. The device for receiving a broadcast signal may include a tuner d25010, a demodulator d25020, a demultiplexer d25030, a video decoder d25040, a subtitle buffer d25050, a subtitle parser d25060, a system clock d25070, a synchronizer d25080, a system information processor d25090 and/or a display processor d25100. The device for receiving a broadcast signal may receive a broadcast signal through the tuner d25010. The device for receiving a broadcast signal may demodulate the received broadcast signal using the demodulator d25020. The device for receiving a broadcast signal may acquire an MPEG-2 TS from the demodulated broadcast signal and demultiplex the TS using the MPEG-2 TS demultiplexer d25030. Here, the demultiplexer can serve as a PID filter. The demultiplexed TS can include an HEVC video stream, compressed XML subtitle components, PSI/SI information and PCR information. The device for receiving a broadcast signal may decode the video stream using the video decoder d25040. In addition, the device for receiving a broadcast signal may store the compressed XML subtitle components using the subtitle buffer d25050 and parse the compressed XML subtitle components using the subtitle parser d25060. Furthermore, the device for receiving a broadcast signal may acquire clock information using the PCR information and the system clock d25070, and the synchronizer d25080 may synchronize the decoded video stream with the parsed subtitle information using a PTS value based on the clock information. The system information processor d25090 may process the PSI/SI information. A method of processing the PSI/SI information will be described in detail below. The display processor d25100 may display the synchronized video stream and subtitle information and display the processed PSI/SI information in an OSD (on screen display) mode. That is, the display processor can notify a user of the language of the corresponding subtitle, whether large print is provided, whether a subtitle for translated language/hard of hearing is provided, etc. through a UI using information included in the XML_subtitling_descriptor.

The operation of processing the PSI/SI information of the receiver displaying an XML subtitle and parsing subtitle information is described in detail below. First, the device for receiving a broadcast signal may detect subtitle event/service information in the XML_subtitling_descriptor( ) delivered at the EIT/SDT event/service level in step 1. That is, information of the XML_subtitling_descriptor signals the language of the corresponding subtitle, whether large print is provided, whether a subtitle for a translated language/hard of hearing is provided, etc. to the user through a UI. Then, the device for receiving a broadcast signal may recognize a combination of components constituting the provided subtitle with respect to the corresponding event/service through multiple service_ids of the subtitling_service_list_descriptor( ) in the EIT/SDT in step 2. Subsequently, the device for receiving a broadcast signal may detect which type of XML subtitle (EBU-TT-D, TTDL or the like) is provided for the event/service using the component_descriptor in the EIT/SDT and determine whether the subtitle can be parsed in step 3. Then, the device for receiving a broadcast signal may detect a component_tag value per stream in the corresponding component descriptor and then detect a stream matched to the corresponding component_tag value using the stream_identifier descriptor of the PMT in step 4. Thereafter, the device for receiving a broadcast signal may send the PID stream matched to the component_tag to the XML parser using the PMT at the time when the event/service is actually broadcast and parse the PID stream in step 5.

The aforementioned operation sequence is not an absolute receiver operation sequence and may be changed according to embodiments. For example, if the user selects a subtitle through a UI and then collects PIDs of components of the subtitle, the user can operate according to the aforementioned operation sequence. However, if service types based on service IDs are signaled first and then component IDs for a select subtitle service is found, step 1 and step 2 can be switched in the receiver operation sequence.

Figure 26:
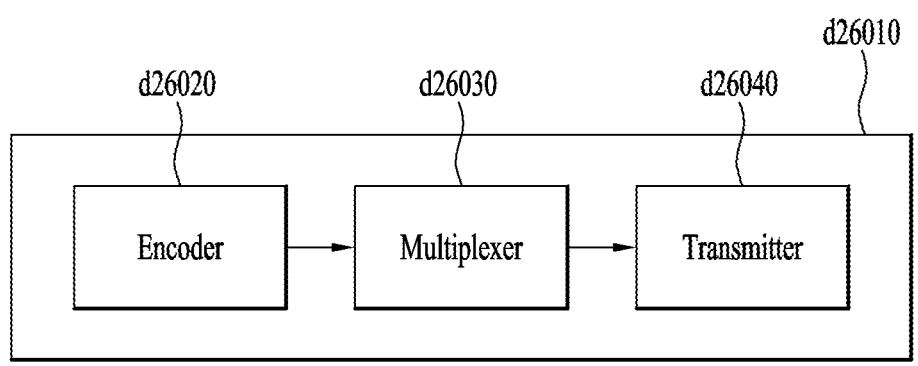
FIG. 26 is a diagram showing a device for transmitting a broadcast signal according to an embodiment of the present invention.

FIG. 26 is a diagram showing a device for transmitting a broadcast signal according to an embodiment of the present invention. A broadcast signal transmission device d26010 may include an encoder d26020, a multiplexer d26030 and a transmitter d26040.

The encoder d26020 may receive UHD, HD or SD video data and encode the video data to generate a video stream. Here, the video stream may be encoded according to HEVC (High Efficiency Video Coding). The video stream may refer to a video elementary stream (ES) or a video packetized elementary stream (PES).

The encoded video stream may be input to the multiplexer d26030 along with SI (signaling information) and an XML subtitle stream. The multiplexer may multiplex the encoded video stream, the SI and the subtitle stream to generate a transport stream (TS). Here, the subtitle stream may be an XML subtitle stream. The method of configuring the TS including the subtitle stream has been described in the above embodiments. The SI is signaling information and can signal information about the XML subtitle stream. As described above, the signaling information can deliver the corresponding subtitle event/service information through the XML_subtitling_descriptor( ) at the EIT/SDT event/service level. That is, information of the XML_subtitling_descriptor can include the language of the corresponding subtitle, whether large print is provided, whether a subtitle for a translated language/hard of hearing is provided, etc. In addition, the signaling information may include a plurality of service_ids in the subtitling_service_list_descriptor( ) in the EIT/SDT, and the service_ids can indicate components in a combination constituting the subtitle with respect to the corresponding subtitle event/service. The transmitter d26040 may transmit the transport stream output from the multiplexer d26030 as a broadcast signal. Here, the transport stream may be channel-coded and modulated before being transmitted as a broadcast signal.

Figure 27:
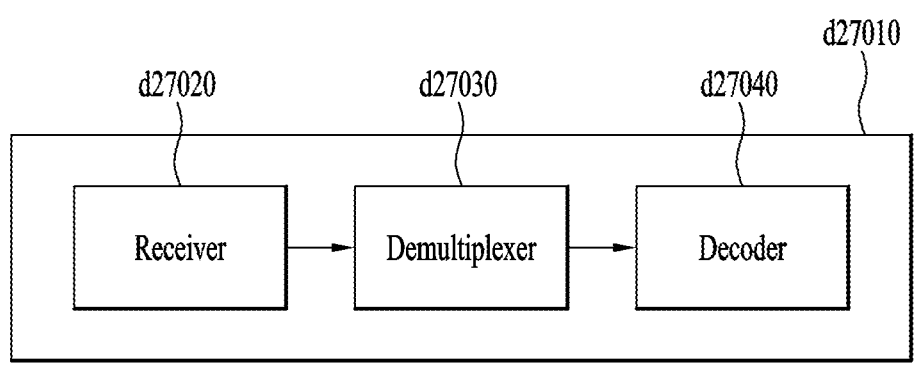
FIG. 27 is a block diagram showing a broadcast receiver according to an embodiment of the present invention.

FIG. 27 is a block diagram showing a broadcast reception device according to an embodiment of the present invention. A broadcast signal reception device d27010 according to the present invention may include a receiver d27020, a demultiplexer d27030 and/or a decoder d27040.

A broadcast signal received by the receiver d27020 may be demodulated and then channel-decoded. The channel-decoded broadcast signal may be input to the demultiplexer d27030 to be demultiplexed into a video stream, SI and a subtitle stream. The broadcast signal reception device may detect corresponding subtitle event/service information in the XML_subtitling_descriptor( ) included in the SI and delivered at the EIT/SDT event/service level. That is, information of the XML_subtitling_descriptor can include the language of the corresponding subtitle, whether large print is provided, whether a subtitle for a translated language/hard of hearing is provided, etc. Then, the broadcast signal reception device may detect which type of XML subtitle (EBU-TT-D, TTDL or the like) is provided for the event/service using the component_descriptor in the EIT/SDT and determine whether the subtitle can be parsed. Thereafter, the broadcast signal reception device may detect a component_tag value per stream in the corresponding component descriptor and then detect a stream matched to the corresponding component_tag value using the stream_identifier descriptor of the PMT. Subsequently, the broadcast signal reception device may send the PID stream matched to the component_tag to the XML parser using the PMT at the time when the event/service is actually broadcast and parse the PID stream. The output of the demultiplexer may be input to the decoder d27040, separated into video data and subtitle data and processed. That is, the decoder may include a video decoder and a subtitle parser. The video stream may be decoded by the video decoder and the subtitle stream may be parsed by the subtitle parser and thus the video stream and the subtitle stream may be output as video data and subtitle data. The video data and the subtitle data may be synchronized with each other and displayed by the receiver. The broadcast signal reception device according to an embodiment of the present invention has been described above in detail with reference to FIG. 25.

Figure 28:
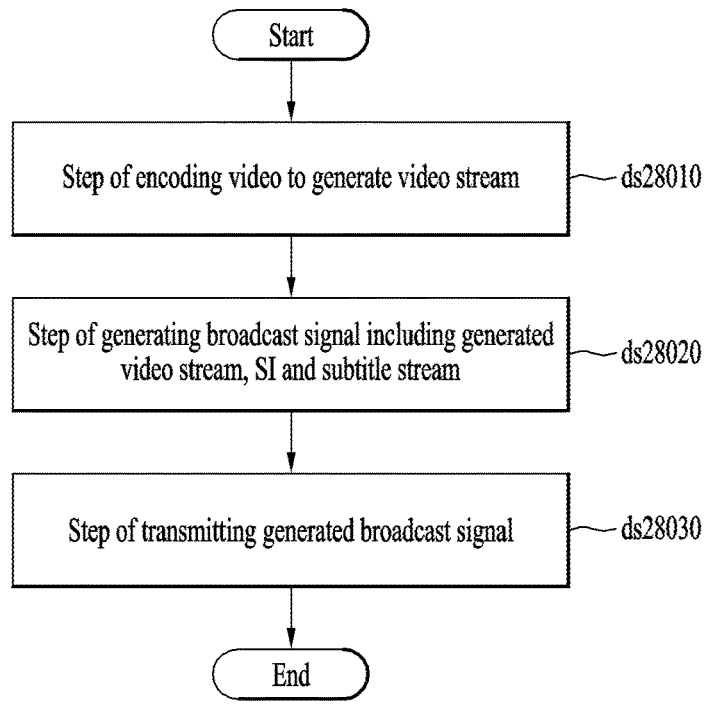
FIG. 28 is a diagram showing a method of transmitting a broadcast signal including XML subtitles according to an embodiment of the present invention.

FIG. 28 is a diagram showing a method of transmitting a broadcast signal including an XML subtitle according to an embodiment of the present invention. The method of transmitting a broadcast signal including an XML subtitle may include a step ds28010 of encoding video data to generate a video stream, a step ds28020 of generating a broadcast signal including the video stream, SI and subtitle information, and a step ds28030 of transmitting the generated broadcast signal.

In step ds28010 of encoding video data to generate a video stream, UHD, HD or SD video data may be received and encoded to generate a video stream. Here, the video stream may be encoded according to HEVC (High Efficiency Video Coding). The video stream may refer to a video elementary stream (ES) or a video packetized elementary stream (PES). In addition, an XML subtitle stream may be generated. In step ds28020 of generating a broadcast signal including the video stream, SI and the subtitle stream, the encoded video stream and the subtitle stream may be multiplexed to generate a transport stream (TS). Here, the subtitle stream may be an XML subtitle stream. The SI is signaling information and can signal information about the XML subtitle stream. As described above, the signaling information can deliver the corresponding subtitle event/service information through the XML_subtitling_descriptor( ) at the EIT/SDT event/service level. That is, information of the XML_subtitling_descriptor can include the language of the corresponding subtitle, whether large print is provided, whether a subtitle for a translated language/hard of hearing is provided, etc. In addition, the signaling information may include a plurality of service_ids in the subtitling_service_list_descriptor( ) in the EIT/SDT, and the service_ids can indicate components in a combination constituting the subtitle with respect to the corresponding subtitle event/service. In step ds28030 of transmitting the generated broadcast signal, the transport stream may be transmitted as a broadcast signal. Here, the transport stream may be channel-coded and modulated before being transmitted as a broadcast signal.

Figure 29:
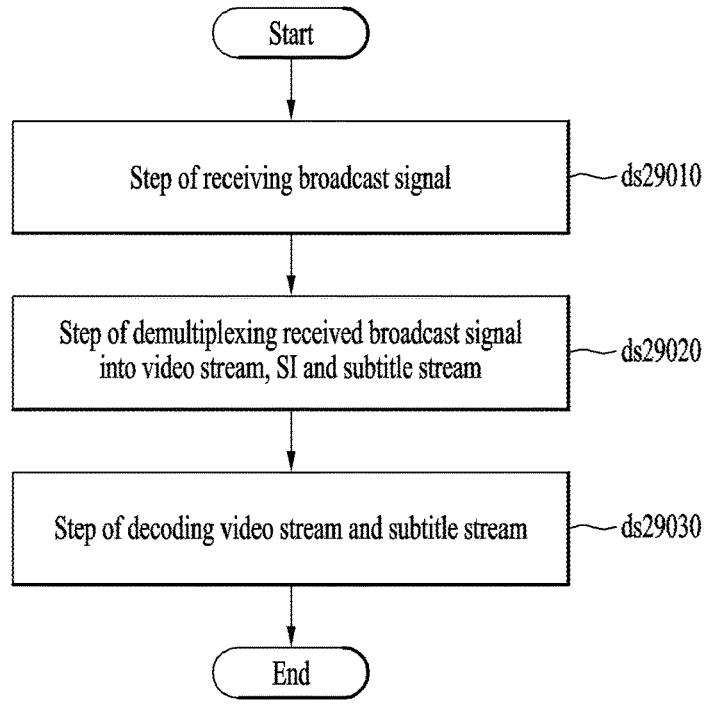
FIG. 29 is a diagram showing a method of receiving a broadcast signal including XML subtitles according to an embodiment of the present invention.

FIG. 29 is a diagram showing a method of receiving a broadcast signal including an XML subtitle according to an embodiment of the present invention. The method of receiving a broadcast signal including an XML subtitle may include a step ds29010 of receiving a broadcast signal, a step ds29020 of demultiplexing the received broadcast signal into a video stream, SI and a subtitle stream, and a step ds29030 of decoding the video stream. In step ds29010 of receiving a broadcast signal, the broadcast signal received using a receiver may be demodulated and then channel-decoded. In step ds29020 of demultiplexing the received broadcast signal into a video stream, SI and a subtitle stream, the channel-decoded broadcast signal may be demultiplexed into a video stream, SI and a subtitle stream using a demultiplexer. The broadcast signal reception method may detect corresponding subtitle event/service information in the XML_subtitling_descriptor( ) included in the SI and delivered at the EIT/SDT event/service level. That is, information of the XML_subtitling_descriptor can include the language of the corresponding subtitle, whether large print is provided, whether a subtitle for a translated language/hard of hearing is provided, etc. Then, the broadcast signal reception method may detect which type of XML subtitle (EBU-TT-D, TTDL or the like) is provided for the event/service using the component_descriptor in the EIT/SDT and determine whether the subtitle can be parsed. Thereafter, the broadcast signal reception method may detect a component_tag value per stream in the corresponding component descriptor and then detect a stream matched to the corresponding component_tag value using the stream_identifier descriptor of the PMT. Subsequently, the broadcast signal reception method may send the PID stream matched to the component_tag to the XML parser using the PMT at the time when the event/service is actually broadcast and parse the PID stream. In step ds29030 of decoding the video stream, the SI and the subtitle stream, the video stream may be decoded using a video decoder to acquire video data. In this step, subtitle data may be acquired from the subtitle stream using a subtitle parser (decoder). The video data and the subtitle data may be synchronized with each other and displayed by the receiver. Synchronization between the video data and the subtitle data may be performed on the basis of PTS information or media time information. The method of receiving a broadcast signal including an XML subtitle has been described above in detail with reference to FIG. 25.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing a computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

MODE FOR INVENTION

Various embodiments have been described in the best mode for carrying out the invention.

INDUSTRIAL APPLICABILITY

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

The invention claimed is:

1. A method of transmitting a broadcast signal including an MPEG-2 transport stream (TS), comprising:
generating video data;
generating a broadcast signal including the generated video data, signaling information and subtitle data; and
transmitting the generated broadcast signal,
wherein the signaling information includes a program map table (PMT),
wherein an eXtensible Markup Language (XML) subtitling descriptor is included in the PMT, and
wherein the XML subtitling descriptor includes Text-To-Speech (TTS) information and purpose information of the subtitle data.

2. The method according to claim 1, wherein the purpose information of the subtitle data represents whether the subtitle data is a subtitle for hard-of-hearing.

3. The method according to claim 1, wherein the subtitle data constituting one subtitling service is transmitted using multiple packet identifiers (PIDs).

4. The method according to claim 1, wherein the signaling information includes a component descriptor in a descriptor loop of an event information table (EIT) or a service description table (SDT), and the component descriptor describes properties of a subtitle stream including XML-based subtitle data.

5. A device for transmitting a broadcast signal including an MPEG-2 transport stream (TS), comprising:
an encoder for generating video data;
a multiplexer for generating a broadcast signal including the generated video data, signaling information and subtitle data; and
a transmitter for transmitting the generated broadcast signal,
wherein the signaling information includes a program map table (PMT),
wherein an eXtensible Markup Language (XML) subtitling descriptor is included in the PMT, and
wherein the XML subtitling descriptor includes Text-To-Speech (TTS) information and purpose information of the subtitle data.

6. The device according to claim 5, wherein the purpose information of the subtitle data represents whether the subtitle data is a subtitle for hard-of-hearing.

7. The device according to claim 5, wherein the subtitle data constituting one subtitling service is transmitted using multiple packet identifiers (PIDs).

8. The device according to claim 5, wherein the signaling information includes a component descriptor in a descriptor loop of an event information table (EIT) or a service description table (SDT), and the component descriptor describes properties of a subtitle stream including XML-based subtitle data.

9. A method of receiving a broadcast signal including an MPEG-2 transport stream (TS), comprising:
receiving a broadcast signal including video data, signaling information and subtitle data,
wherein the signaling information includes a program map table (PMT),
wherein an eXtensible Markup Language (XML) subtitling descriptor is included in the PMT, and
wherein the XML subtitling descriptor includes Text-To-Speech (TTS) information and purpose information of the subtitle data;
decoding the signaling information; and
decoding the video data and the subtitle data.

10. The method according to claim 9, wherein the purpose information of the subtitle data represents whether the subtitle data is a subtitle for hard-of-hearing.

11. A device for receiving a broadcast signal including an MPEG-2 transport stream (TS), comprising:
a tuner to receive a broadcast signal including video data, signaling information and subtitle data,
wherein the signaling information includes a program map table (PMT),
wherein an eXtensible Markup Language (XML) subtitling descriptor is included in the PMT, and
wherein the XML subtitling descriptor includes Text-To-Speech (TTS) information and purpose information of the subtitle data; and
a decoder to decode the signaling information, the video data and the subtitle data.

12. The device according to claim 11, wherein the purpose information of the subtitle data represents whether the subtitle data is a subtitle for hard-of-hearing.

* * * * *